US011498019B2

(12) United States Patent
Elms et al.

(10) Patent No.: US 11,498,019 B2
(45) Date of Patent: Nov. 15, 2022

(54) APPARATUS AND METHOD FOR GAS-LIQUID SEPARATION OF MULTI-PHASE FLUID

(71) Applicant: HAVEN TECHNOLOGY SOLUTIONS LLC, Magnolia, TX (US)

(72) Inventors: David James Elms, Magnolia, TX (US); Gregory Allen Hudspeth, Amarillo, TX (US)

(73) Assignee: HAVEN TECHNOLOGY SOLUTIONS LLC, Magnolia, TX (US)

( * ) Notice: Subject to any disclaimer, the term of this patent is extended or adjusted under 35 U.S.C. 154(b) by 288 days.

(21) Appl. No.: 16/721,406

(22) Filed: Dec. 19, 2019

(65) Prior Publication Data

US 2020/0197836 A1 Jun. 25, 2020

Related U.S. Application Data

(60) Provisional application No. 62/783,158, filed on Dec. 20, 2018.

(51) Int. Cl.
*B01D 19/00* (2006.01)

(52) U.S. Cl.
CPC ................. *B01D 19/0057* (2013.01)

(58) Field of Classification Search
CPC ............... B01D 19/00; B01D 19/0057; B01D 19/0042; B01D 19/0094; B01D 17/0217; B01D 17/038; B01D 45/04; B01D 45/12
See application file for complete search history.

(56) References Cited

U.S. PATENT DOCUMENTS

| 1,306,003 A * | 6/1919 | Good ..................... B01D 45/16 |
| | | 237/68 |
| 2,049,578 A | 8/1936 | Werts |
| (Continued) | | |

FOREIGN PATENT DOCUMENTS

| CN | 101218010 A | 7/2008 |
| CN | 105148625 A | 12/2015 |
| (Continued) | | |

OTHER PUBLICATIONS

Mail Stop PCT ISA/US, International Application No. PCT/US2019/067614, dated Feb. 24, 2020, 13 pages, United States of America.

(Continued)

*Primary Examiner* — Youngsul Jeong
(74) *Attorney, Agent, or Firm* — Haynes and Boone, LLP

(57) ABSTRACT

A multi-phase separation apparatus shapes a fluid stream in a flow shaping line having a plurality of descending, vertically stacked curvilinear loops disposed along a fluid vessel vertical axis, stratifying the fluid stream into a primarily liquid component and a primarily gaseous component. At a point below plurality of loops, the primarily gaseous component is bled off from the primary liquid component. The primarily gaseous component may be introduced into a vortex cluster to further separate liquid entrained in the gaseous component, which separated liquid may then be combined back with the primarily liquid component. The vertically stacked curvilinear loops may be disposed within a fluid vessel to protect and insulate the loops or may be disposed about the exterior of the vessel. The vortex cluster system may be positioned within the vessel and may employ vortex tubes deployed along either a linear flow channel or a spiral flow channel.

17 Claims, 20 Drawing Sheets

(56) References Cited

U.S. PATENT DOCUMENTS

| | | |
|---|---|---|
| 2,468,070 A | 4/1949 | Hunter |
| 3,346,117 A | 10/1967 | Page, Jr. |
| 3,450,264 A | 6/1969 | Graybill |
| 3,543,846 A | 12/1970 | Smith et al. |
| 3,670,507 A | 6/1972 | Mott et al. |
| 4,438,817 A | 3/1984 | Pokladnik et al. |
| 4,474,035 A | 10/1984 | Amin et al. |
| 4,527,632 A | 7/1985 | Chaudot |
| 4,816,044 A | 3/1989 | Weisert et al. |
| 5,004,552 A * | 4/1991 | Al-Yazdi ............ B01D 17/0208 210/512.1 |
| 5,154,741 A | 10/1992 | da Costa Filho |
| 5,165,450 A | 11/1992 | Marrelli |
| 5,248,421 A | 9/1993 | Robertson |
| 5,286,375 A | 2/1994 | Marrelli |
| 5,426,950 A * | 6/1995 | Ament .................... F25B 45/00 62/85 |
| 5,431,228 A | 7/1995 | Weingarten et al. |
| 5,578,209 A | 11/1996 | Weiss |
| 5,707,427 A | 1/1998 | Beck et al. |
| 5,749,945 A | 5/1998 | Beck |
| 6,062,213 A | 5/2000 | Fuisz et al. |
| 6,068,053 A | 5/2000 | Shaw |
| 6,197,095 B1 | 3/2001 | Ditria et al. |
| 6,276,455 B1 | 8/2001 | Gonzalez |
| 6,280,000 B1 | 8/2001 | Zupanick |
| 6,569,323 B1 | 5/2003 | Pribytkov |
| 6,651,745 B1 | 11/2003 | Lush et al. |
| 6,773,605 B2 | 8/2004 | Nyborg et al. |
| 6,857,132 B1 | 2/2005 | Rakib et al. |
| 6,989,103 B2 | 1/2006 | Mohsen et al. |
| 7,006,500 B1 | 2/2006 | Pedersen et al. |
| 7,103,772 B2 | 9/2006 | Jørgensen et al. |
| 7,134,498 B2 | 11/2006 | Hopper |
| 7,152,682 B2 | 12/2006 | Hopper |
| 7,209,442 B1 | 4/2007 | Chapman |
| 7,279,098 B2 | 10/2007 | Freeman |
| 7,314,559 B2 | 1/2008 | Hopper |
| 7,331,396 B2 | 2/2008 | Reimert et al. |
| 7,363,982 B2 | 4/2008 | Hopper |
| 7,497,263 B2 | 3/2009 | Parris et al. |
| 7,532,627 B2 | 5/2009 | Chapman et al. |
| 7,539,208 B2 | 5/2009 | Chapman et al. |
| 7,569,097 B2 | 8/2009 | Pen et al. |
| 7,613,209 B1 | 11/2009 | Nguyen et al. |
| 7,630,361 B2 | 12/2009 | Chapman et al. |
| 7,646,786 B2 | 1/2010 | Droms et al. |
| 7,701,951 B2 | 4/2010 | Chapman et al. |
| 7,720,101 B2 | 5/2010 | Chapman et al. |
| 7,773,594 B2 | 8/2010 | Asati et al. |
| 7,782,898 B2 | 8/2010 | Chapman et al. |
| 7,817,553 B2 | 10/2010 | Parandekar |
| 7,835,274 B2 | 11/2010 | Chapman et al. |
| 7,864,686 B2 | 1/2011 | Chapman et al. |
| 7,865,727 B2 | 1/2011 | Zeng et al. |
| 7,905,946 B1 | 3/2011 | Weislogel et al. |
| 7,957,305 B2 | 6/2011 | Zeng et al. |
| 8,149,833 B2 | 4/2012 | Fox et al. |
| 8,160,098 B1 | 4/2012 | Liu et al. |
| 8,255,682 B2 | 8/2012 | Zeng |
| 8,419,833 B2 | 4/2013 | Elms et al. |
| 8,797,854 B2 | 8/2014 | Bernstein et al. |
| 8,861,546 B2 | 10/2014 | Sheng et al. |
| 9,320,989 B2 | 4/2016 | Elms et al. |
| 9,435,185 B2 | 9/2016 | Wright et al. |
| 9,441,430 B2 | 9/2016 | Selman et al. |
| 9,722,850 B2 | 8/2017 | Bugajski et al. |
| 9,932,732 B1 | 4/2018 | Batten et al. |
| 2002/0052927 A1 | 5/2002 | Park |
| 2002/0067721 A1 | 6/2002 | Kye |
| 2002/0131426 A1 | 9/2002 | Amit et al. |
| 2002/0134546 A1 | 9/2002 | Zupanick |
| 2003/0043802 A1 | 3/2003 | Yazaki et al. |
| 2003/0150324 A1 | 8/2003 | West |
| 2004/0163129 A1 | 8/2004 | Chapman et al. |
| 2004/0244043 A1 | 12/2004 | Lind et al. |
| 2005/0078699 A1 | 4/2005 | Cummings |
| 2005/0145388 A1 * | 7/2005 | Hopper .................. E21B 43/40 166/267 |
| 2005/0150827 A1 | 7/2005 | Hopper |
| 2007/0062863 A1 | 3/2007 | Freeman |
| 2007/0131429 A1 | 6/2007 | Brammer |
| 2008/0017594 A1 | 1/2008 | Sarshar et al. |
| 2008/0210097 A1 | 9/2008 | Washio |
| 2008/0236839 A1 | 10/2008 | Oddie |
| 2009/0025936 A1 | 1/2009 | Donald et al. |
| 2009/0056939 A1 | 3/2009 | Hackworth et al. |
| 2009/0084263 A1 | 4/2009 | Obrejanu |
| 2009/0242197 A1 | 10/2009 | Hackworth et al. |
| 2009/0266550 A1 | 10/2009 | Fenton |
| 2010/0084352 A1 | 4/2010 | Pondelick et al. |
| 2010/0187186 A1 | 7/2010 | Howdeshell et al. |
| 2011/0270431 A1 | 11/2011 | Holley et al. |
| 2012/0152855 A1 | 6/2012 | Lean et al. |
| 2012/0160502 A1 | 6/2012 | Pettigrew |
| 2012/0199000 A1 | 8/2012 | Elm et al. |
| 2014/0260993 A1 * | 9/2014 | Elms .................. B01D 19/0063 55/495 |
| 2015/0167415 A1 | 6/2015 | Leuchtenberg |
| 2017/0113171 A1 | 4/2017 | Bala et al. |
| 2017/0275521 A1 | 9/2017 | Babcock et al. |

FOREIGN PATENT DOCUMENTS

| | | |
|---|---|---|
| CN | 105377401 A | 3/2016 |
| CN | 106474828 A | 3/2017 |
| DE | 3707071 C1 | 8/1988 |
| DE | 19923901 A1 | 11/2000 |
| EP | 1352679 A1 | 10/2003 |
| EP | 1353038 A1 | 10/2003 |
| EP | 1518595 B1 | 3/2005 |
| FR | 3063912 A1 | 9/2018 |
| GB | 499024 A | 1/1939 |
| GB | 2260087 A | 4/1993 |
| GB | 2553004 A | 2/2018 |
| KR | 101086778 B1 | 6/2011 |
| WO | WO-2005068044 A1 | 7/2005 |
| WO | WO2006020559 A3 | 2/2006 |
| WO | WO-2012040252 A2 | 3/2012 |
| WO | WO-2017100422 A1 | 6/2017 |

OTHER PUBLICATIONS

Extended Search Report issued for European Patent Application No. 19899497.2, dated Aug. 19, 2022, 9 pages.

Office Action issued for Chinese Patent Application No. 201980092521.5, dated Jul. 22, 2022, 20 pages with translation.

* cited by examiner

APPARATUS AND METHOD FOR GAS-LIQUID SEPARATION OF MULTI-PHASE FLUID

PRIORITY CLAIM

This application claims the benefit of priority to U.S. Provisional Application No. 62/783,158, filed Dec. 20, 2018 the benefit of which is claimed and the disclosure of which is incorporated by reference in its entirety.

FIELD OF THE INVENTION

The present disclosure generally relates to the separation of components in a multi-phase fluid stream utilizing a flow shaping apparatus to restructure a flow regime. In particular, the disclosure relates to improvements in an overall system utilizing vertically stacked curvilinear loops and a vortex cluster system.

BACKGROUND OF THE INVENTION

A gas-liquid two phase fluid stream includes a mixture of different fluids having different phases, such as air and water, steam and water, or oil and natural gas. It is often desirable to separate the gas and liquid components of a fluid stream from one another. Conventional vertical or horizontal gas-liquid separators are available to separate gas from liquid. Conventional separators typically employ mechanical structures, wherein an incoming fluid strikes a diverting baffle which initiates primary separation between the gas and liquid components. Mesh pads or demister pads are then used to further remove suspended liquid. The sizing of a separator and the particular characteristics of the separator is dependent upon many factors, which may include, the flow rate of the liquid, the liquid density, the vapor density, the vapor velocity, and inlet pressure. Vertical separators are typically selected when the vapor/liquid ratio is high or the total flow rate is low. Horizontal separators are typically preferred for low vapor/liquid ratio or for large volumes of total fluid.

More recently, two-phase flow separators may employ a curvilinear flow line formed in multiple loops or coils prior to separation of a fluid components from the flow path. Shaping the multi-phase flow into a curvilinear path allows centrifugal force to more readily force the heavier, denser liquid to the outside or outer diameter wall of the flow shaping line in the curved path and allow the lighter, less dense vapor or gas to flow along the inside or inner diameter wall of the flow shaping line. Once a flow regime has been restructured within the curvilinear flow line, the gas component of a liquid-gas fluid stream will collect along the inner diameter wall of the curved flow shaping line, where the gas component can be drawn or driven into an exit port located on the inner wall, thereby permitting a majority, if not all, of the gas, along with a low amount of liquid, to be sent to a conventional gas-liquid separator. While the separated fluid has a comparatively higher ratio of gas to liquid than the primary fluid stream, the separated fluid stream is typically wet gas and has an amount of liquid entrained in the gas. It is desirable to capture this liquid as well for various purposes.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

In the detailed description of the invention, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

Generally, a two-phase flow separator system is provided. In some embodiments, the two-phase flow separator system employs a curvilinear flow line system in combination with a fluid vessel to improve operation of the curvilinear flow line system, separating a two-phase fluid into a primarily liquid component and a primarily gaseous component. In one or more embodiments, the curvilinear flow line system is disposed around the outer perimeter of the fluid vessel, while in other embodiments, the curvilinear flow line system is disposed within the interior of the vessel. In one or more embodiments, a vortex cluster system may be utilized to treat the primarily gaseous gas component downstream of the curvilinear flow line system. The vortex cluster system may be positioned within the interior of vessel, while in other embodiments, the vortex cluster system may be external to the vessel. In yet other embodiments, a curvilinear flow line system may be combined with the vortex cluster system of the disclosure without any vessel. The vortex cluster system may be linear or annular. In this regard, in some embodiments, the annular vortex cluster system on its own may be a two-phase flow separator system.

Figure 1:
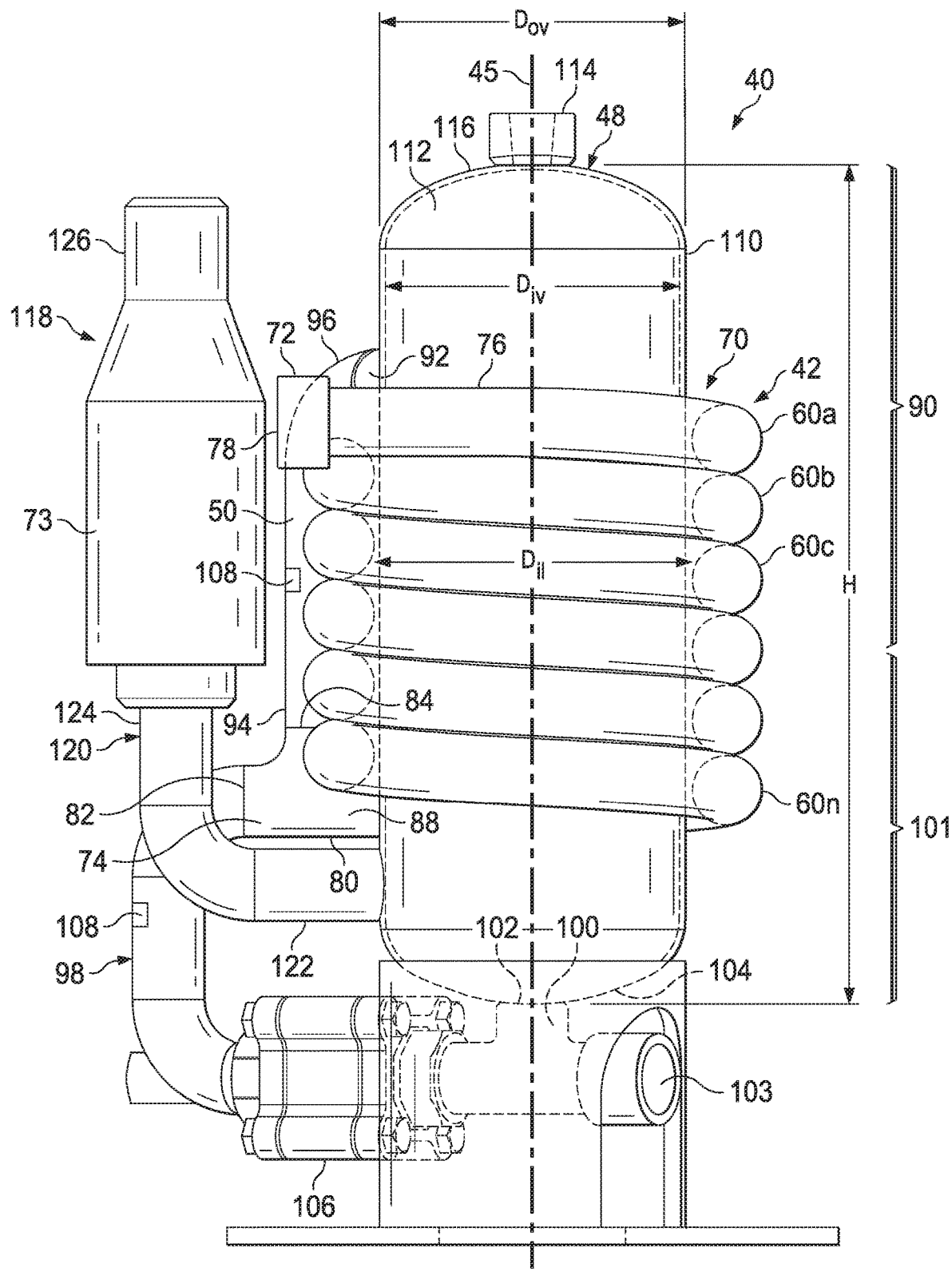
FIG. 1 is an elevation view of a two-phase flow separator system of the disclosure employing a separation tank and backflow valve to optimize separation.

With reference to FIG. 1, one embodiment of a two-phase flow separator system 40 is illustrated. As used herein, "two-phase" refers to a fluid with at least one gaseous component and at least one liquid component, although the fluid may have more than one gaseous or liquid component. A curvilinear flow line 42 is disposed around the outer periphery of a fluid vessel 48 which fluid vessel 48 is formed along a substantially vertical axis 45. The curvilinear flow line 42 has a first pipe 316 having a first end 72 and a second end 74. Between first end 72 and second end 74, pipe 316 forms a plurality of curvilinear pipe loops 60a, 60b, 60c . . . 60n arranged adjacent one another about substantially vertical axis 45. In the illustrated embodiment, six loops 60 are shown, however, a fewer or greater number of loops 60 may be utilized, although at least two loops are preferable. In one or more embodiments, at least a portion of the curvilinear pipe loops 60 are of the same diameter and the pipe loops 60 are adjacent one another in a vertically stacked arrangement such that each curvilinear pipe loop 60 is substantially horizontal. In any event, first pipe 316 may include a substantially horizontal portion 76 at the first end 72 terminating in an inlet 78. Similarly, first pipe 316 may include a substantially horizontal portion 80 at the second end 74 terminating in a liquid outlet 82. In one or more embodiments, the first end 72 is positioned above the second end 74 relative to vertical axis 45. As such, pipe loops 60 are descending in that fluid flow from first end 72 to second end 74 flows downward. In addition, a gas outlet port 84 is disposed along the first pipe 316 along the horizontal portion 80. The gas outlet port 84 is preferably disposed along the upper pipe surface 86 of the horizontal portion 80. Gas outlet port 84 and liquid outlet 82 may be adjacent one another such that horizontal portion 80 forms a "T" junction 88 along pipe 316.

Extending upward from gas outlet port 84 is a riser 50. In one or more embodiments, riser 50 is in fluid communication with fluid vessel 48 such that fluid vessel 48 functions as a gas separator into which fluid (typically wet gas) flowing up along riser 50 can be collected. In this regard, riser 50 is in fluid communication with an upper portion 90 of fluid vessel 48 via a port 92 in fluid communication with the upper portion 90. More specifically, riser 50 may be substantially vertical and may be substantially parallel with vertical axis 45. Riser 50 may have a first lower end 94 in fluid communication with the gas outlet port 84 and a second upper end 96 in fluid communication with fluid vessel 48. In this regard, riser 50 may be in fluid communication with an upper portion 90 of fluid vessel 48.

A liquid flow line 98 extends from liquid outlet 82. Liquid flow line 98 includes a first outlet 100 in fluid communication with a lower portion 101 of vessel 48, and a second outlet 103, downstream of first outlet 100. First outlet 100 may be in fluid communication with a liquid port 102 located in the bottom or lowest end 104 of vessel 48.

In one or more embodiments, a backpressure device 106 may be positioned along liquid flowline 98 upstream of the first outlet 100, between outlet 82 of first pipe 316 and first outlet 100 of flowline 98. Backpressure device 106 may be any mechanism which can be actuated as desired to adjust or regulate the pressure of the fluid flowing along liquid flow line 98, including without limitation a valve, such as a mechanical valve or an automated valve. In this regard, a sensor 108 may be provided to measure a condition of the fluid flowing along either riser 50 or liquid flow line 98 or both, which sensor(s) 108 may be utilized to adjust backpressure device 106 to optimize two-phase separation as described. In particular, it will be appreciated that backpressure device 106 impedes or slows the flow out of liquid through outlet 82 of first pipe 316 in order to create a wave of liquid within first pipe 316 downstream of gas outlet port 84 which enhances flow of the separated primarily gaseous component into riser 50.

As described above, fluid vessel 48 is generally formed along a substantially vertical axis 45 and has a vessel wall 110 defining a vessel interior 112. In the depicted embodiment, vessel 48 has a vessel height H and vessel wall 110 defines an outer vessel diameter Dov and an inner vessel diameter Div. In the illustrated embodiment, vessel 48 is elongated along axis 45, such that height H is greater than outer vessel diameter Dov. However, in other embodiments, outer vessel diameter Dov may be greater than height H. In any event, in this embodiment of two-phase flow separator system 40, pipe loops 60 are arranged about the exterior of vessel 48 adjacent wall 110. Thus, pipe loops 60 may have an inner loop diameter Dil which is slightly larger than outer vessel diameter Dov. In addition to the liquid port 102 located in the bottom or lowest end 104 of vessel 48, a gas port 114 may be disposed in the top or upper end 116 of vessel 48.

In one or more embodiments, pipe loops 60 extend along vertical axis 45 for only a portion of the height H of fluid vessel 48. In this regard, the lowest pipe loop 60n is spaced apart above the bottom or lowest end 104 of vessel 48 so as to permit a portion of liquid flowing through liquid flow line 98 to be charged back into vessel 48 as desired.

One advantage to the above-described configuration of pipe loops 60 disposed in conjunction with fluid vessel 48 as described above, is the effects that gas collected in the upper portion 90 of fluid vessel 48 has on hammering or compression fluid downstream of outlet 103. Specifically, the collected gas dampens downstream fluid flow and in particular, fluid pulses that may arise in the fluid flow. In this regard, in some embodiments, two-phase flow separator system 40 may further include an air relief mechanism 118 to maintain a select fluid level within fluid vessel 48. Specifically, a standpipe 120 having a first end 122 in fluid communication with the lower portion 101 of fluid vessel 48 and a substantially vertical second end 124 in fluid communication with an air relief vessel 70 having a gas outlet port 126 at an upper end thereof. It will be appreciated by adjusting the length of the substantially vertical second end 124 of standpipe 120, and adjusting the pressure of gas within air relief vessel 70, the liquid level (not shown) within fluid vessel 48, and hence the gas volume within fluid vessel 48 can be adjusted. In alternative embodiments, air relief mechanism 118 may be replaced with an automated control system to maintain a desired fluid level within fluid vessel 48. In either case, it has been found that by maintaining a desired fluid level, such as a constant fluid level, within fluid vessel 48, downstream effects of changing flow rates into vessel 48 are dampened. In other words, air relief mechanism 118 functions as a fluid dampener to mitigate against the downstream effects of fluctuations in fluids pumped into separator system 40. Specifically, changes in the flow rate that could result in a kick experienced by downstream equipment, such as pumps, engines and the like, are mitigated by air relief mechanism 118 in order to achieve a more constant flow rate downstream. In other embodiments, air relief mechanism 118 may be incorporated within vessel 48, such as a gas bladder (not shown) or similar device.

It will be appreciated that various operations involving pumping or manipulation of liquids can result in unintentional mixing of air or other gas with the liquid. The presence of gas in such liquid can have undesirable impacts. For example, it may be desirable to measure a volume of liquid, such as during fuel bunkering operations, the transfer of liquids such as hydrocarbons in a pipeline, the transfer of liquid such as chemicals between storage vessels, or the monitoring of consumption of fuel by an internal combustion engine. Gas entrained in liquid in each of these cases may yield an inaccurate measurement of the liquid. In other operations, the presence of gas in a liquid may have undesirable results relating to the liquid itself. For example, in the manufacture or production of food products, air within a liquid may impact flavor, quality or shelf-life of the food. As an example, in the handling of milk (such as pasteurizing), air inadvertently mixed with the milk may impact the taste of the milk. In another example, in the production of chemicals or refining of hydrocarbons, air entrained in liquid chemical may impact the grade or quality of the chemicals or ultimate product manufactured utilizing the chemical. In yet other operations, the presence of air or other gas in a liquid may impact equipment utilized to handle the liquid. For example, in the pumping of a liquid, air entrained in the liquid can cause cavitation at the impeller blades or piston of a pump, reducing the effectiveness of the pump and decreasing the operational life of the pump by corrosion of the pump parts.

Since the handling of fluids often results in the introduction of gas, typically in the form of air bubbles, into the liquid component of the fluid, as described herein, it is desirable to remove the gas. Thus, a fluid stream arising is introduced into the two-phase flow separator system. In the two-phase flow separator system, the fluid stream is directed downward through a plurality of descending curvilinear loops to stratify the fluid stream into a first fluid component comprising primarily a gas phase and a second fluid component comprising primarily a liquid phase. Once stratified, then the first fluid component can be removed from the stratified fluid stream through the riser described above, leaving the second fluid component as a liquid with a desirable percentage of the gas removed.

As used herein, a two-phase stream refers to a fluid stream having both a liquid component and a gaseous component. The liquid component may further include an additive in the form of a solid component, such as proppant carried therein, or in the form of another liquid, but the focus of the two-phase flow separator system 40 is to separate the gaseous component from the liquid component and liquid additive mixed with or solid additive carried by the liquid component. More specifically, a two-phase fluid stream is introduced into first pipe 316 via inlet 78. The two-phase fluid stream is directed into a curvilinear flow line 42 formed by the plurality of curvilinear pipe loops 60. In one or more embodiments, the curvilinear pipe loops 60 are descending from inlet 78 adjacent an upper portion 90 of vessel 48 downward relative to substantially vertical axis 45 of fluid vessel 48 to outlet 74 adjacent the lower portion 101 of vessel 48. Loops 60 create an increased distribution of a first fluid component comprising primarily gas, along the inner perimeter of each loop 60, while the relatively heavier and denser second fluid component comprising primarily liquid (and any liquid or solid additive) is driven to the outer perimeter of each loop due to centrifugal force of curvilinear flow path, thus creating a high concentration of gas along the inner perimeter of loops 60 closest to vessel 48. With two-phase fluid stream forming a more stratified flow regime, or at least the distribution or volume of gas near the inner perimeter of curvilinear flow line 42, the substantially gaseous fluid flow may be effectively separated at gas outlet port 84 from the substantially liquid fluid of the second fluid component passing through horizontal portion 80 of first pipe 316.

The separated first fluid component is thus comprised primarily of gas with a low percentage of liquid entrained therein. This first fluid component, in the form of "wet gas", may then be directed into a conventional gas-liquid separator, such as vessel 48.

In any case, once gas has been removed from the fluid stream the by the two-phase flow separator system 40, the remaining fluid stream, namely the second fluid component, can be processed or utilized or otherwise directed as desired.

Figure 2:
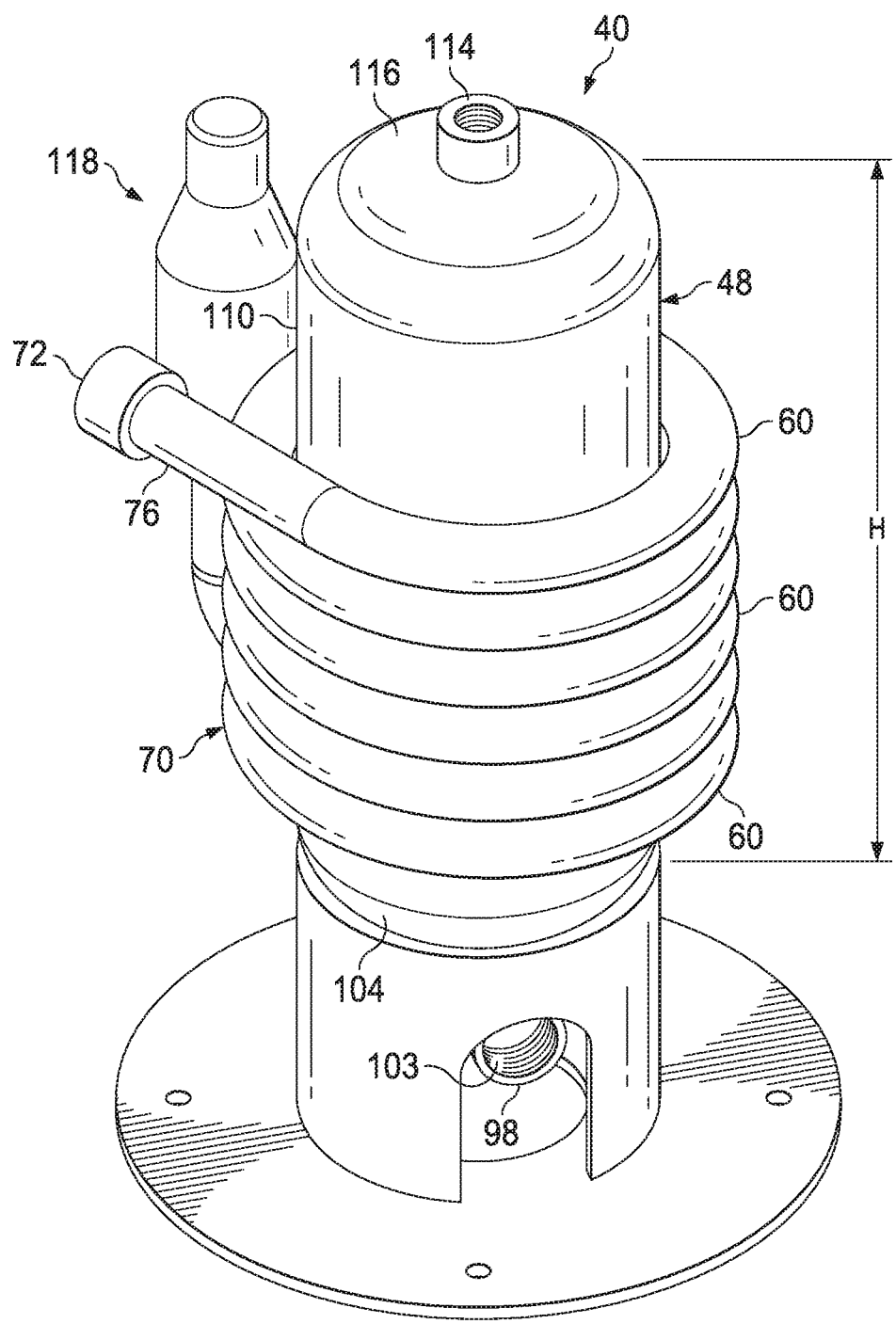
FIG. 2 is a perspective view of the flow separator system of FIG. 1.

FIG. 2 is a perspective view of the two-phase flow separator system 40 described in FIG. 1. As shown, a portion of the height H of fluid vessel 48 is wrapped by a plurality of pipe loops 60 forming first pipe 316 extending from a first end 72. A liquid flow line 98 having a second outlet 50 extends under vessel 48 to allow liquid flow line 98 to be in fluid communication with a lower end 104 of vessel 48. An air relief mechanism 118 may be utilized to maintain the liquid (not shown) within vessel 48 at a desired level. Vessel also includes a gas port 114 at its upper end 116 for release of gas captured within vessel 48.

Figure 3:
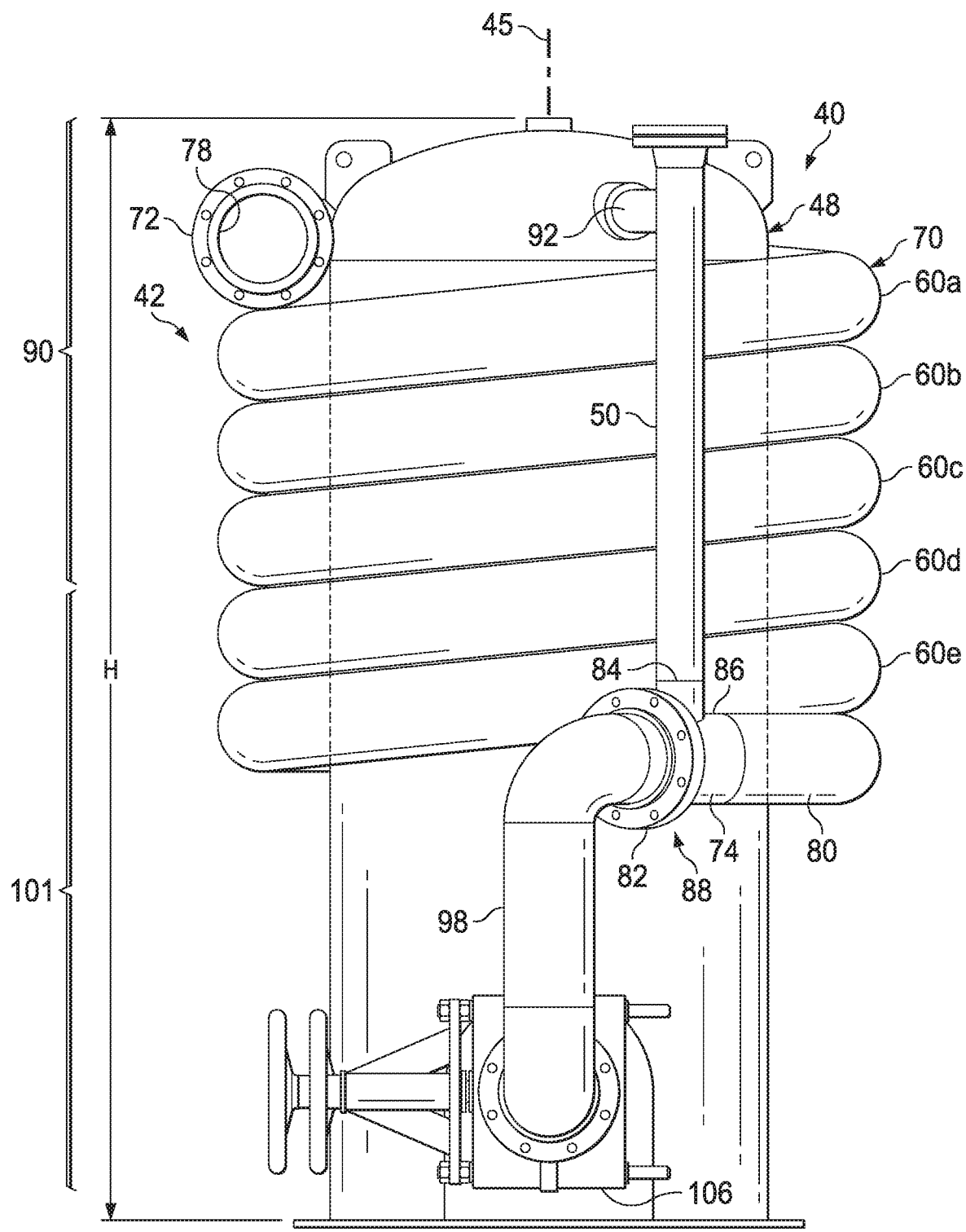
FIG. 3 is an elevation view of another embodiment of a two-phase flow separator system of the disclosure employing a separation tank.

FIG. 3 is a perspective view of another embodiment of two-phase flow separator system 40, but without the air relief mechanism 118 of FIGS. 1 and 2. As shown, a portion of the height H of fluid vessel 48 is wrapped by a plurality of pipe loops 60 forming first pipe 316.

More specifically, the curvilinear flow line 42 includes a first pipe 316 having a first end 72 and a second end 74. Between first end 72 and second end 74, first pipe 316 forms a plurality of curvilinear pipe loops 60a, 22b, 22c . . . 22n arranged adjacent one another about substantially vertical axis 15. In any event, first pipe 316 may include an inlet 78. Similarly, first pipe 316 may include a substantially horizontal portion 80 at the second end 74 terminating in a liquid outlet 82. In addition, a gas outlet port 84 is disposed along the first pipe 316 along the horizontal portion 80. The gas outlet port 84 is preferably disposed along the upper pipe surface 86 of the horizontal portion 80. Gas outlet port 84 and liquid outlet 82 may be adjacent one another such that horizontal portion 80 form a "T" junction 88 along pipe 316.

Extending upward from gas outlet port 84 is a riser 50. In one or more embodiments, riser 50 is in fluid communication with fluid vessel 48 such that fluid vessel 48 functions as a gas separator into which fluid flowing up along riser 50 can be collected. In this regard, riser 50 is in fluid communication with an upper portion 90 of fluid vessel 48 via port 92.

A liquid flow line 98 extends from liquid outlet 82. Liquid flow line 98 may pass under fluid vessel 48.

In one or more embodiments, a backpressure device 106 may be positioned along liquid flowline 98 to enhance extraction of wet gas at gas port 84.

Figure 4:
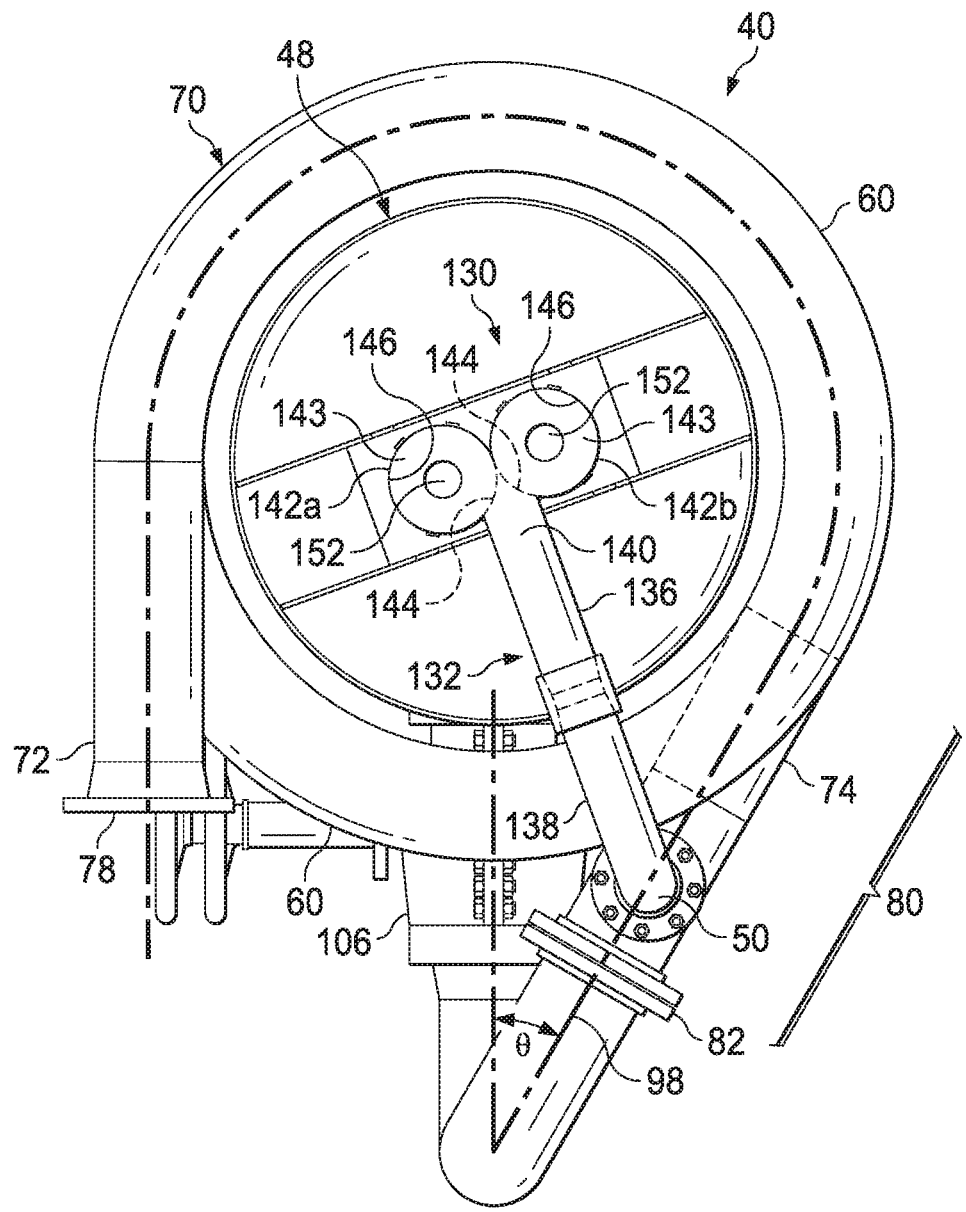
FIG. 4 is cut-away top view of another embodiment of a two-phase flow separator system, in which a curvilinear flow line system is combined a vortex cluster system.
Figure 7:
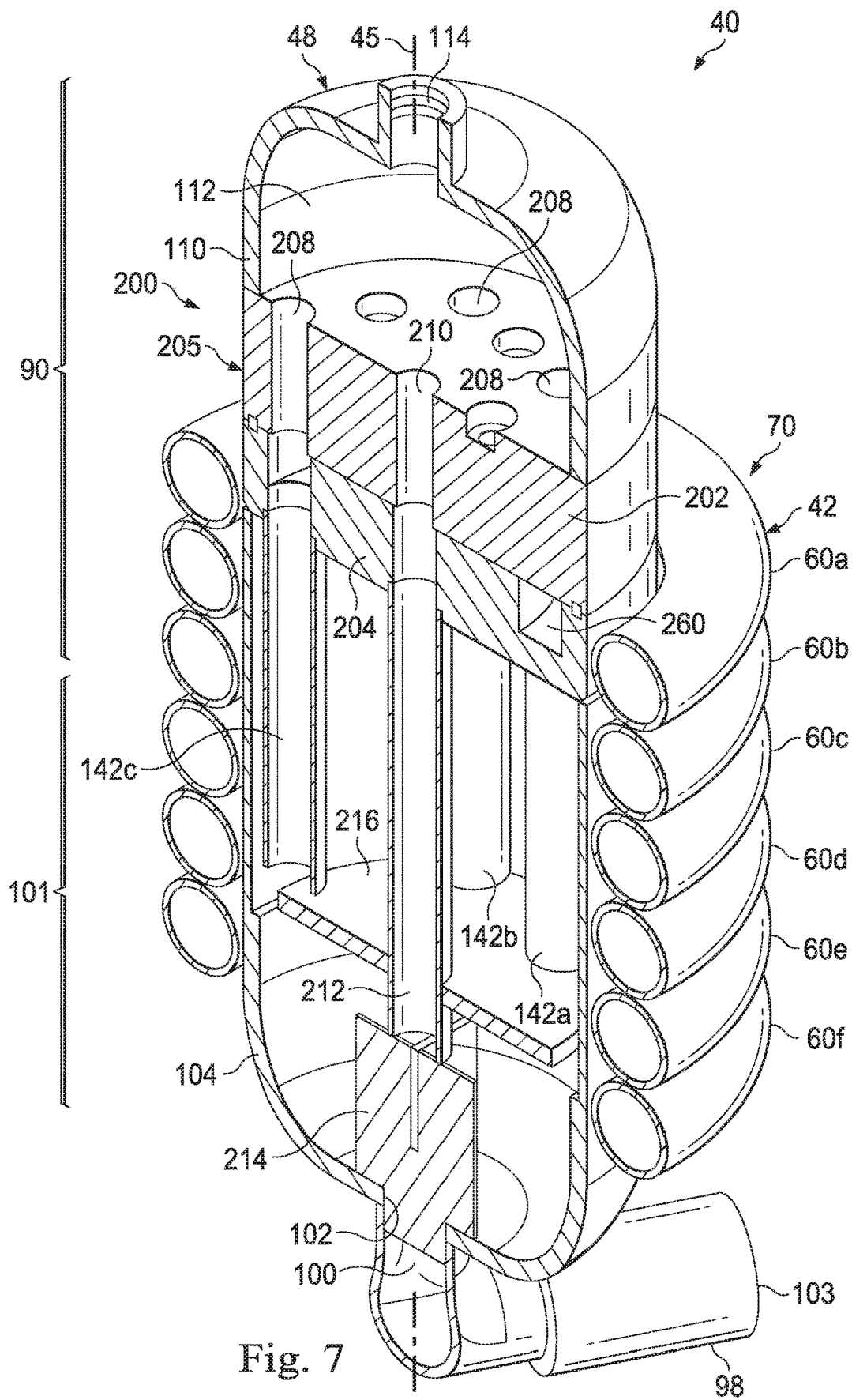
FIG. 7 is cut-away perspective view of another embodiment of a two-phase flow separator system, in which a curvilinear flow line system of FIG. 1 is combined with an annular vortex cluster system.

With reference to FIG. 4, another embodiment of a two-phase flow separator system 40 is shown. In this embodiment, the two-phase flow separator system 40 is similar to FIGS. 1, 2 and 3, but further includes a vortex cluster system 130 disposed within vessel 48. Specifically, rather than simply delivering a fluid flow into an upper portion 90 of vessel 48, riser 50 is in fluid communication with a vortex cluster system 130. In any event, shown in FIG. 7 is first pipe 316 wrapped around fluid vessel 48 to form a plurality of pipe loops 60 along at least a portion of the height H (see FIG. 1) of fluid vessel 48. First pipe 316 has a first end 72 and a second end 74. First pipe 316 includes an inlet 78. First pipe 316 may include a substantially horizontal portion 80 at the second end 74 terminating in a liquid outlet 82. Extending upward from second end 74 is a substantially vertical riser 50. In one or more embodiments, riser 50 is in fluid communication with fluid vessel 48 such that fluid vessel 48 functions as a gas separator into which fluid flowing up along riser 50 can be collected. In some embodiments, the vortex cluster system 130 is disposed in the upper portion 90 (see FIG. 1) of fluid vessel 48.

In some embodiments, such as illustrated in FIG. 4, vortex cluster system 130 may include a fluid injection conduit 132 forming a channel 136 having a first end 138 in fluid communication with riser 50 and a second end 140 terminating adjacent at least one vertically positioned vortex tube 142 extending down into vessel 48. In the illustrated embodiment, at least two vortex tubes 142a, 142b are illustrated. In one or more embodiments with two or more tubes 142, tubes 142 may be positioned on opposing sides of channel 136. Each vortex tube 142 has a first upper end and a second lower end, with an opening 144 in a portion of the cylindrical, vertical sidewall 146 forming the tube 142, so that opening 144 functions as an inlet with a leading edge 148 and a trailing edge 150 (see FIG. 9). A first upper end of the tube 142 adjacent the opening 144 may include a gas port 152 and a second lower end of the tube 142 may be open. In one or more embodiments, the leading edge 148 is approximately parallel with the channel 136 at the point of intersection between the channel 136 and the vortex tube 142. In other words, the channel 136 intersects the vortex tube 142 at the leading edge 148 so as to be generally tangential to the vortex tube 142 at the point of intersection with the leading edge 148. Wet gas under pressure flows along conduit 132 and enters each tube 142 through its corresponding inlet 144 at an upper end of the vortex tube 142, entering the vortex tube 142 tangentially that is, at a tangent to the internal cylindrical wall 146 of each of the vortex tube 142. A vortex tube 142 functions to separate an immiscible liquid component from a wet gas stream by utilizing centrifugal force. Wet gas enters fluid injection conduit 132, flows along channel 136 and through opening 144 into the interior of the vortex tube 142 tangentially so that the fluids swirl at a rapid rate within the vortex tube 142. The swirling gas causes entrained liquids to be expelled and to encounter the vortex tube 142 internal cylindrical wall 146 where the liquids accumulate and fall downwardly by gravity to ultimately flow out of the vortex tube 142 into vessel 48. The swirling gas component of the fluid stream having substantially less density than the entrained liquid component migrates to the axial center of each vortex tube 142 and flows out through the upper gas port 152. While vortex tubes 142 are generally described as straight tubes, in other embodiments, vortex tubes 142 may be tapered to gradually narrow or gradually expand along the length of the tube 142.

Figure 5:
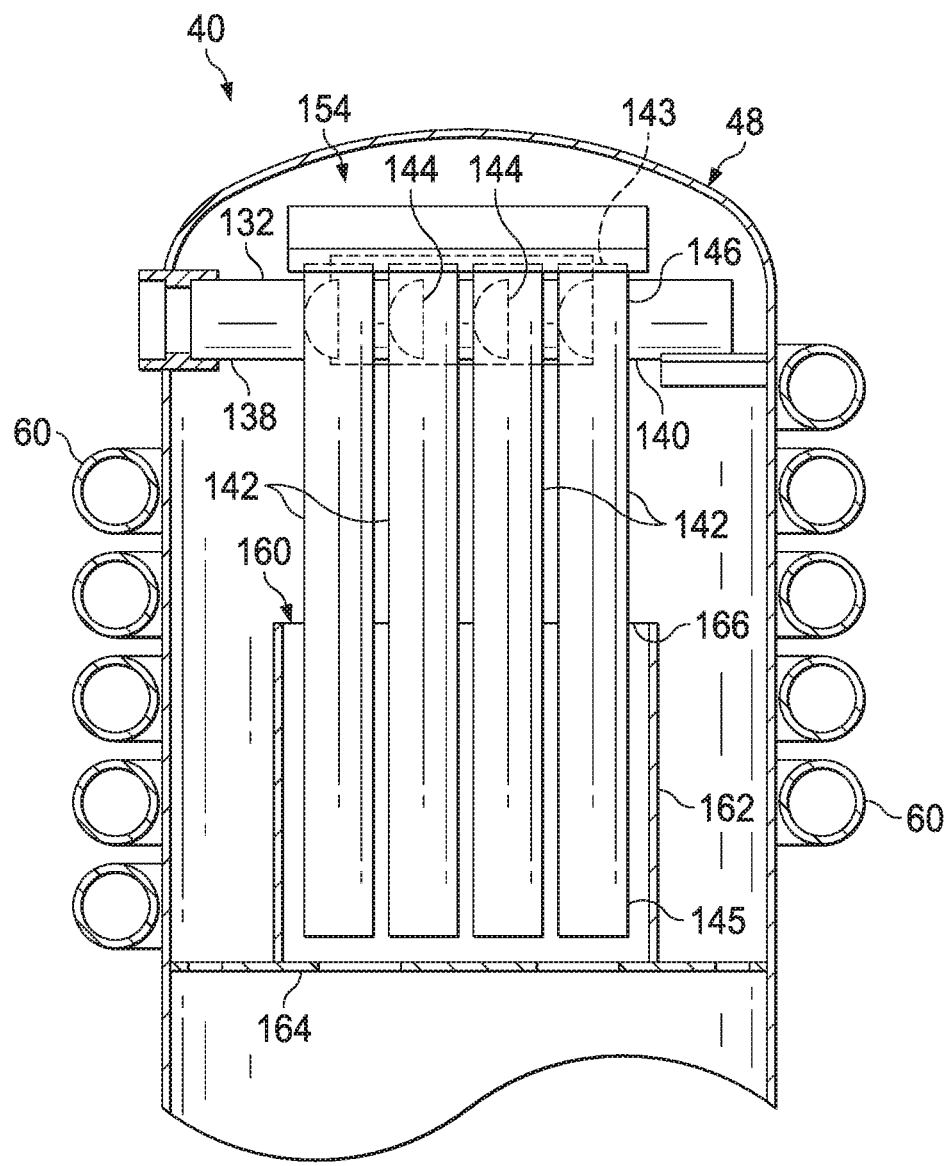
FIG. 5 is cut-away side view of another embodiment of a two-phase flow separator vessel with a with a linear vortex cluster system disposed therein.
Figure 6:
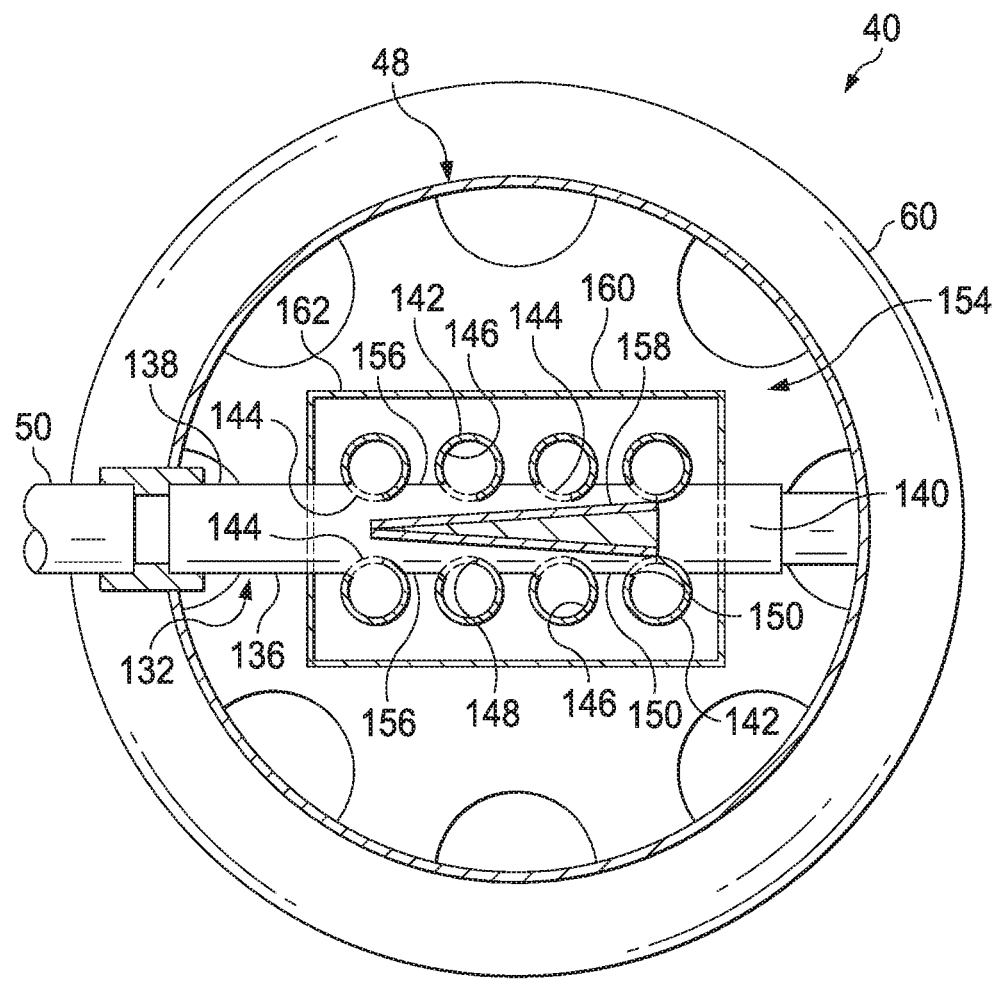
FIG. 6 is cut-away top view of another embodiment of a two-phase flow separator system of FIG. 8.
Figure 8:
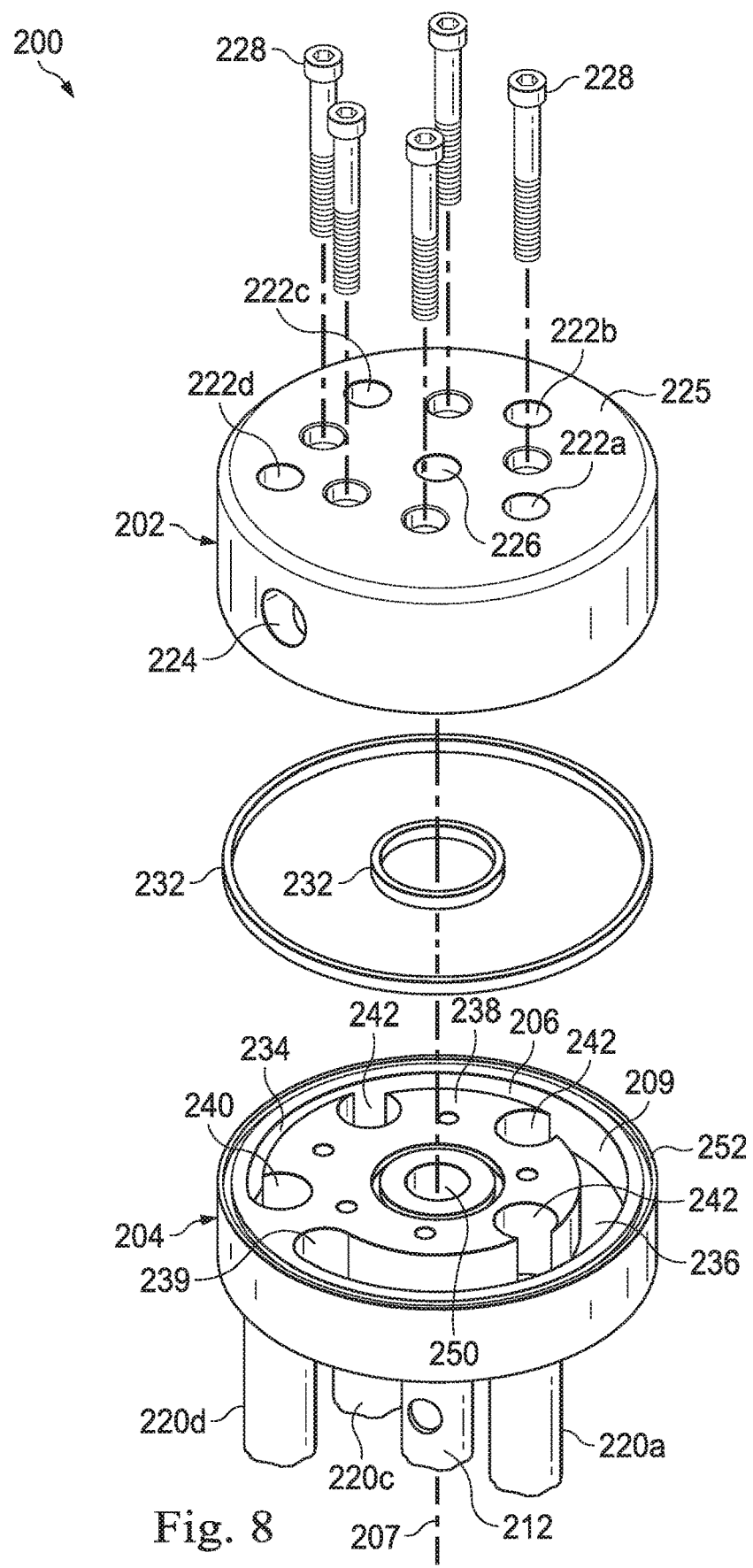
FIG. 8 is an exploded perspective view of an annular vortex cluster system.
Figure 9:
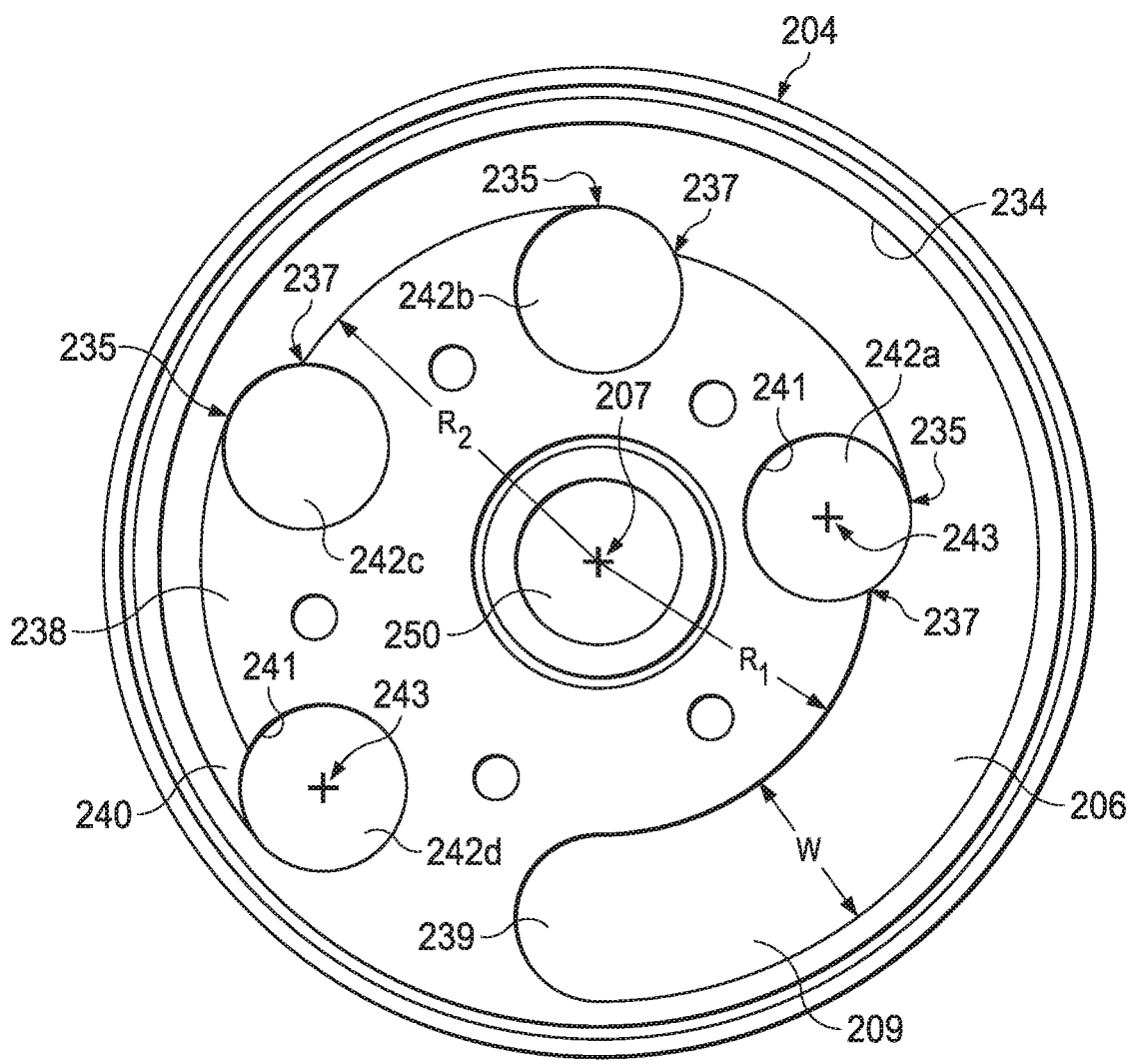
FIG. 9 is a plan view of the body of an annular vortex cluster system.

In FIGS. 5 and 6, another embodiment of a vortex cluster system 130 of FIG. 4 used in a two-phase flow separator system 40 is illustrated, wherein the vortex cluster system is a linear vortex cluster system 154. Linear vortex cluster system 154 is illustrated positioned within vessel 48 of the various two-phase flow separator systems described herein having a plurality of curvilinear pipe loops 60 positioned about the exterior of vessel 48. Fluid injection conduit 132 is substantially linear and forms a linear channel 136 with opposing sides 156 and having a first end 138 in fluid communication with riser 50 and a second end 140 terminating adjacent at least one vertically positioned vortex tube 142 extending down into vessel 48. In the illustrated embodiment, a plurality of vortex tubes 142 are spaced apart along conduit 132 so as to communicate with channel 136. Each vortex tube 142 has an opening 144 in a portion of the cylindrical, vertical sidewall 146 thereof so that opening 144 functions as an inlet with a leading edge 148 and a trailing edge 150. Where linear vortex cluster system 154 includes two or more vortex tubes 142, tubes 142 may be spaced apart along channel 136. Likewise, where linear vortex cluster system 154 includes two or more vortex tubes 142, tubes 142 may be positioned on opposing sides 156 of channel 136. The illustrated embodiment of FIGS. 8 and 9 illustrate eight vortex tubes 142 spaced apart along channel 136 and positioned on opposing sides of channel 136. In one or more embodiments, the cross-sectional area of channel 136 may gradually decrease along a portion of the length of channel 136 between ends 138, 140. This may be accomplished in some embodiments by positioning a gradually expanding wedge or tapered wall 158 or similar mechanism along channel 136 to promote flow of wet gas into the tube openings 96 of vortex tubes 142. While vortex tubes 142 are generally described as straight tubes, in other embodiments, vortex tubes 142 may be tapered to gradually narrow or gradually expand along the length of the tube 142.

In one or more embodiments as shown, a receptacle 160 may be provided into which vortex tubes 142 extend. Receptacle 160 includes a receptacle wall 162 and a receptacle base 164 spaced apart from the lower open end 166 of the vortex tubes 142. As liquid exits vortex tubes 142, the liquid will collect in receptacle 160 and eventually spill over the top edge 166 of receptacle 160, thereby further promoting separation of remaining gas that may be in fluid exiting tubes 142.

Turning to FIG. 7, another embodiment of a two-phase flow separator system 40 is shown. In this embodiment, the two-phase flow separator system 40 is similar to FIGS. 1-3, but further includes an annular vortex cluster system 200. In this embodiment, annular vortex cluster system 200 functions in conjunction with curvilinear flow line 42 disposed around the outer periphery of fluid vessel 48 which fluid vessel 48 is formed along a substantially vertical axis 45. The curvilinear flow line 42 has a first pipe 70 forming a plurality of curvilinear pipe loops 60a, 60b, 60c, 60d, 60e, 60f arranged adjacent one another about vessel wall 110 and extending along at least a portion of the length of vertical axis 45 of vessel 48. Vessel 48 has a lower end 104 with a liquid port 102 formed therein and an upper end 116 with a gas port 114 formed therein. A liquid flow line 98 extends below the lower end 104 of vessel 48, where a first outlet 100 is in fluid communication with a lower portion 101 of vessel 48 via liquid port 102 in order to initially introduce liquid into the lower portion 101 of vessel 48 and thereafter assist in maintaining a desired liquid level within lower portion 101 of vessel 48. Liquid flow line 98 further includes a second outlet 103 downstream of first outlet 100.

Annular vortex cluster system 200 generally includes a housing 205 in which an annular channel 206 is defined. Annular channel may be spiral in shape about axis 45. Housing 205 may be formed of an upper portion 202, which may be a top plate, and a lower portion 204, which may be a vortex body. In one or more embodiments, the cross-sectional area of channel 206 may gradually narrow along at least a portion of its length. In one or more embodiments, housing 205 may be disk-shaped. Extending down from housing 205 are two or more vortex tubes 142, such as vortex tubes 142a, 142b and 142c illustrated in FIG. 3. Vortex tubes 142 are each in fluid communication with an aperture 208 extending through top plate 202. Likewise, an exhaust channel 210 may extend through body 204 and top plate 202 to allow gas to flow between the interior of vessel 48 below annular vortex cluster system 200 and the gas port 114 in the upper end 116 of vessel 48. In one or more embodiments, annular vortex cluster system 200 is disposed within the interior 112 of vessel 48.

In one or more embodiments, annular vortex cluster system 200 is disposed in the upper portion 90 of vessel 48. In particular, annular channel 206 is in fluid communication with riser 50 (see FIG. 1) so that the primarily gaseous fluid passing therethrough enters annular channel 206 in order to flow through annular vortex cluster system 200 to further enhance separation of gas from liquid entrained in the primarily gaseous fluid flow.

Although not necessary for the operation of annular vortex cluster system 200 or two-phase flow separator system 40, in some embodiments, a measurement tube 212 may extend down from housing 205. A breaker plate 214 may be positioned adjacent the distal end of measurement tube 212, so as to be generally adjacent liquid port 102. Breaker plate 214 is provided to prevent a vortex from forming in liquid disposed in the lower portion 101 of vessel 48, it being understood that such a vortex could inhibit fluid flow through liquid port 102. In some embodiments, a portion of breaker plate 214 extends into liquid port 102. In some embodiments, breaker plate 214 may comprise two or more plates. However, it will be understood that breaker plate 214 could be any structure or mechanism capable of preventing the formation of a liquid vortex adjacent fluid port 102.

Similarly, a diverter plate 216 may positioned adjacent the distal end of vortex tubes 142 to eliminate the natural downward vortices from each vortex tube 142.

In FIG. 8, annular vortex cluster assembly 200 is shown in an exploded perspective view. Annular vortex cluster assembly 200 generally includes an upper portion 202, such as a top plate, and a lower portion 204, such as a vortex body, formed about a central axis 207. The upper portion 202 and lower portion 204 join together to form a chamber 209. In one or more embodiments, the upper portion 202 and lower portion 204 together form a disk-shaped housing 205. For ease of description, the upper portion 202 may be referred to as a top plate and the lower portion 204 may be referred to as a vortex body.

Extending down from body 204 are two or more vortex tubes 220, such as vortex tubes 220a, 220b and 220c (with a fourth vortex tube 220d not visible). Vortex tubes 220 are each in fluid communication with an aperture 222 extending through top plate 202. In particular, in some embodiments, each vortex tube 220a-d may communicate with a separate, but corresponding aperture 222a-d, respectively, formed in top plate 202, which apertures 22a-d may be aligned with their corresponding vortex tubes 220a-d.

A fluid inlet 224 is provided to permit fluid to flow into chamber 209 of housing 205. In some embodiments, fluid inlet 224 is formed in top plate 202 as shown, while in other embodiments, fluid inlet 224 may be disposed in the side of vortex body 204. An exhaust port 226 is shown formed in the top plate 202, which exhaust port 226 may be coaxial with central axis 207. Fasteners 228 may be provided to secure top plate 202 to body 204. In the illustrated embodiment, fasteners 228 are threaded and disposed to engaged with threaded bores 219 disposed in body 204. One or more seals 232 may be provided to seal between body 204 and top plate 402.

As shown, body 204 if formed of an outer cylindrical wall 234 and a base 236 disposed about central axis 207. An inner hub 238 within housing 205 is spaced apart from cylindrical wall 234 to form annular channel 206 therebetween. In some embodiments, hub 238 may be integrally formed with as part of vortex body 204. In some embodiments, hub 238 may be integrally formed as part of top plate 202 to extend into chamber 209 when top plate 202 and vortex body 204 are joined together. Channel 206 annularly extends from a first end 239 to a second end 240. In one or more embodiments, channel 239 gradually narrows in width W or cross-sectional area between the first and second ends 239, 240. In one or more embodiments, hub 238 is characterized by a radius R that increases at its periphery from a smaller radius R1 to a larger radius R2 between the first and second ends 239, 240 thereby resulting in the narrowing width W of channel 206 permitting channel 206 to function as a nozzle, increasing the velocity of the fluid as it flows from first end 239 to second end 240. In one or more embodiments, the gradually narrowing, annular channel 206 is spiral in shape.

Formed in hub 238 about central axis 207 are two or more cut bores 242, each cut bore 242 formed generally adjacent the periphery of hub 238 so as to intersect spiral channel 206, thus forming a leading edge 235 and a trailing edge 237 for each cut bore 242. Each cut bore 242 extends through base 236 to form an outlet (not show) in base 236. In the illustrated embodiment, four cut bores 242a, 242b, 242c and 242d are shown. Moreover, cut bores 242 are generally positioned about axis 207 in a generally spiral arrangement to track the spiral shape of channel 206. In some embodiments, a cut bore 242, such as cut bore 242d is positioned at the second end 240 of channel 206. Likewise, in some embodiments, the first cut bore 242, such as cut bore 242a, is spaced apart from the first end 239 of channel 206. In any event, as best seen in FIG. 9, because of the gradually decreasing radius R of hub 238, as fluid flows along spiral channel 206 from the first end 239 to the second end 240, the trailing edge 237 of each cut bore 242 directs a portion of the fluid flow into the leading edge 235 of the cut bore 242, which fluid portion then spirals into cut bore 242, with centrifugal force driving the liquid portion of the fluid flow to the cut bore walls 241 and the gaseous portion collecting generally along the axis 243 of the cut bore 242.

An exhaust channel 250 may extend through body 204. Body 204 further includes an open end 252 to which top plate 202 attaches to enclose channel 206.

In operation, a fluid stream enters annular vortex cluster assembly 200 through fluid inlet 224. The fluid stream is directed along a spiral flowpath by annular channel 206, driving heavier liquids in the flow stream to the outer cylindrical wall 234 of the assembly 200. As the fluid travels along the spiral flowpath formed by annular channel 206, a portion of the fluid closest to the inner hub 238 is tangentially directed into a cut bore 242. Specifically, the leading edge 235 of the cut bore 242 extends into the flowpath so as to divert a portion of the fluid flow into cut bore 242. The diverted portion of the fluid flow enters the cut bore 242 tangentially. Gravitational forces cause the spiraling fluid in the cut bore 242 to spiral downward into the vortex tube 220 in fluid communication with the cut bore 242. As the diverted portion continues to spiral downward along the vortex tube 220, as in the cut bore 242, the liquid component of the diverted portion will collect along the outer wall of the vortex tube 220 and the gaseous component of the diverted portion will collect generally along the center axis 243 of the tube 220, allowing the gaseous component to pass upward through tube 220 to aperture 222 in the plate 202 above the vortex tube 220 and cut bore 242. Because annular channel 206 gradually narrows along its length, it functions as a nozzle to impact the velocity of the fluid stream moving along channel 206. At each consecutive cut bore 242 along annular channel 206, a portion of the fluid stream is diverted as described above.

Fluid flowrate through annular vortex cluster assembly 200 is dependent on the number and diameter of the vortex tubes 220, which in turn, establishes the diameter of housing 205. The more vortex tubes 220 utilized in an annular vortex cluster assembly 200, the higher the flowrate can be for the fluid stream. Relatedly, the more vortex tubes 220 utilized, the larger the diameter of housing 205. In one or more embodiments, annular channel 206 may spiral so as to have more than one revolution about axis 207. In such case, cut bores 242 and their related vortex tubes 220 may have a gradually decreasing diameter between ends 239, 240.

Figure 10:
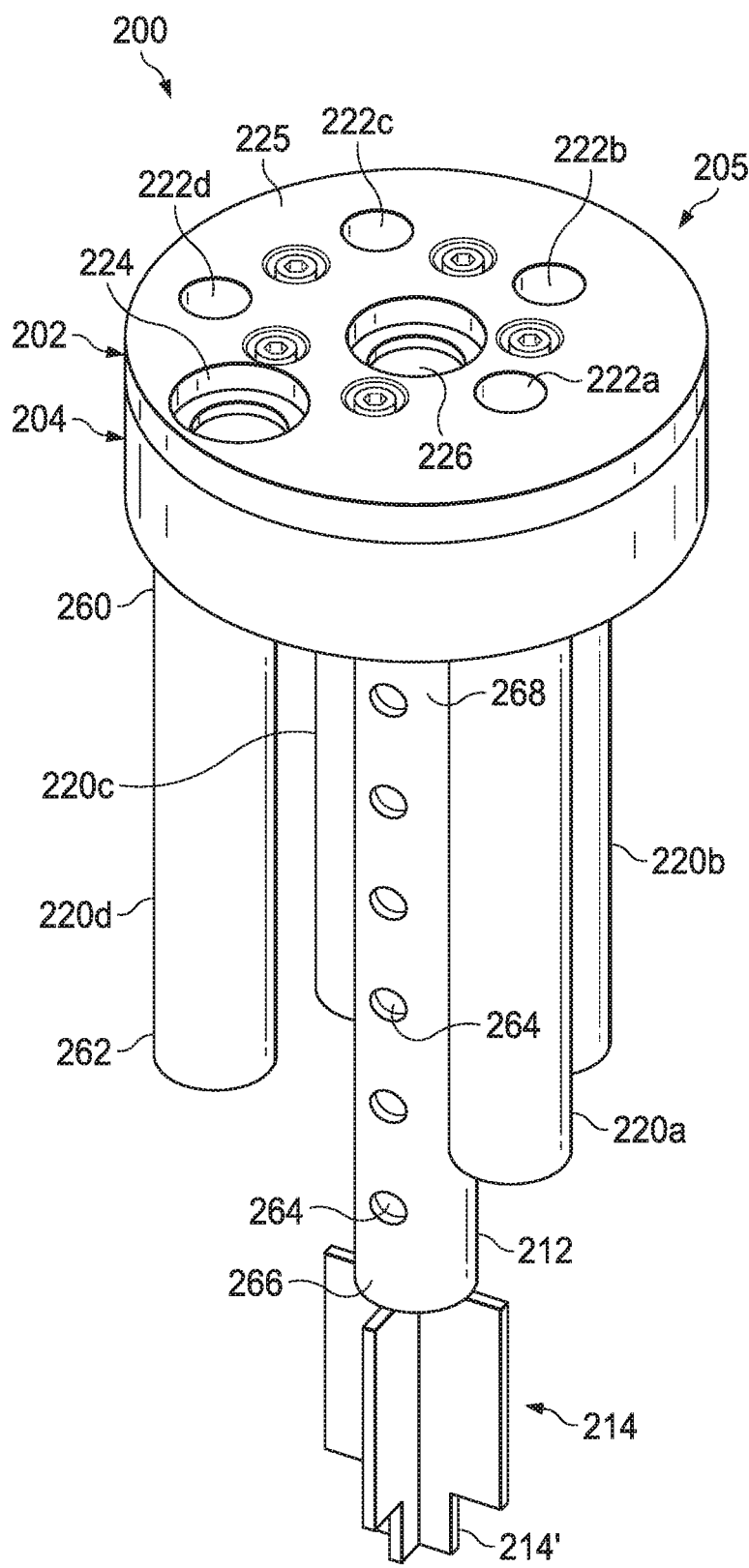
FIG. 10 is perspective view of the vortex cluster system of FIG. 8.
Figure 11:
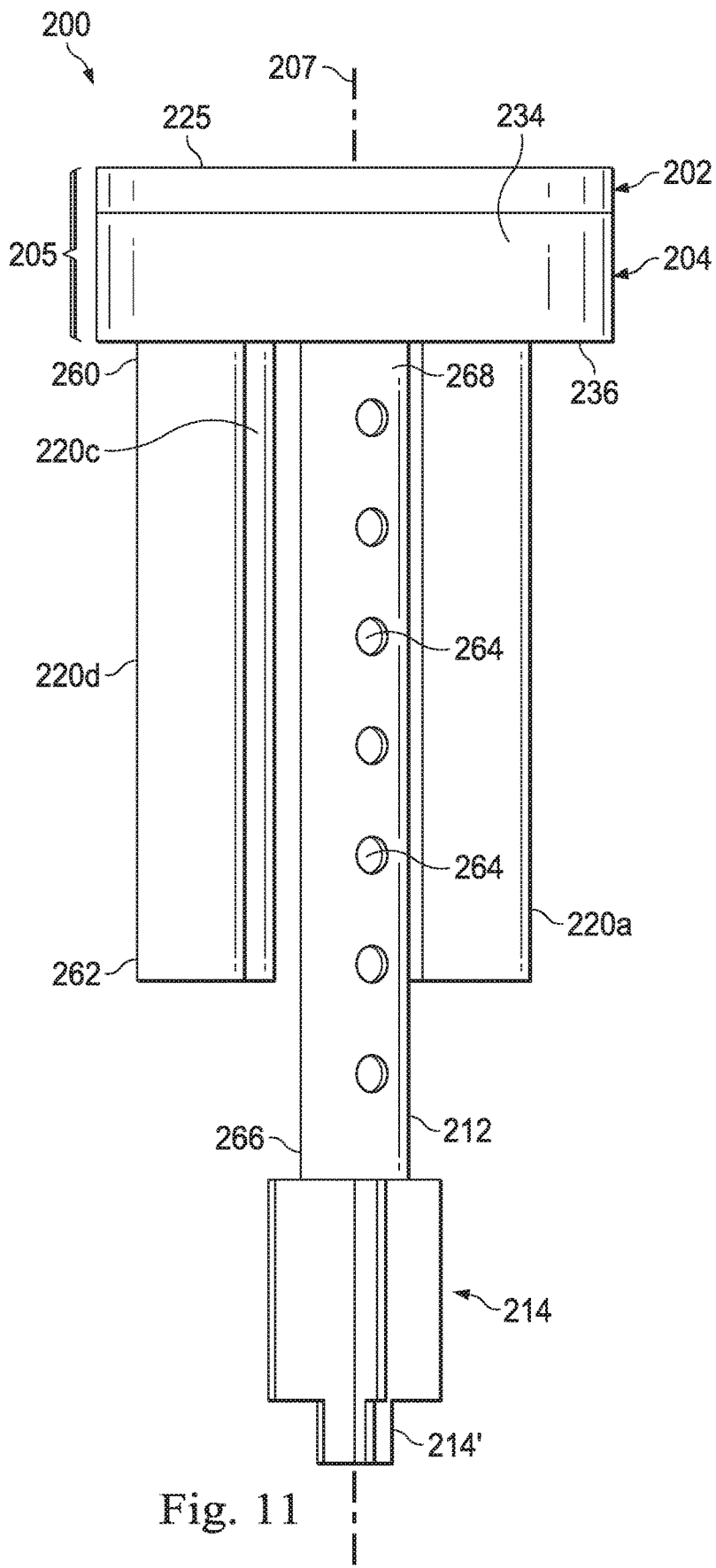
FIG. 11 is perspective view the vortex cluster system of FIG. 8.

Turning to FIGS. 10 and 11, an annular vortex cluster assembly 200, is illustrated in more detail. Annular vortex cluster assembly 200 includes a vortex housing 205 generally having an upper portion 202, such as a top plate, and a lower portion 204, such as a vortex body, formed about a central axis 207. In one or more embodiments, vortex housing 205 may be disk-shaped. Extending down from housing 205, and in particular, lower portion 204, are two or more vortex tubes 220, such as vortex tubes 220a, 220b and 220c. Vortex tubes 220 are each in fluid communication with an aperture 222 extending through top plate 202. In particular, in some embodiments, each vortex tube 220 may communicate with a separate, but corresponding aperture 222 formed in top plate 202. Each tube has a proximal end 260 adjacent body 204 and a distal end 262. While vortex tubes 220 are shown as generally straight tubes, in other embodiments, vortex tubes 220 may be tapered to gradually narrow or gradually expand along the length of the tube 220 between ends 260 and 262.

A fluid inlet 224 is provided to permit fluid to flow into the interior of vortex housing 205. In some embodiments, fluid inlet 224 is formed in top plate 202 as shown, while in other embodiments, fluid inlet 224 may be disposed in the side of vortex body 204 (see FIG. 8). In some embodiments, fluid inlet 224 is formed in the top surface 225 of top plate 202 as shown, while in other embodiments, fluid inlet 224 may be disposed in the side of top plate 202 (see FIG. 8), or alternatively, in vortex body 204. An exhaust port 226 is shown formed in the top plate 202, which exhaust port 226 may be coaxial with central axis 207.

Although not necessary for the operation of annular vortex cluster system 200, in some embodiments, a measurement tube 212 may extend down from body 204. This is particularly true where annular vortex cluster system 200 is deployed in a vessel, such as vessel 48 of FIG. 7. Measurement tube 212 may include one or more apertures 264 along at least a portion of its length to allow liquid egress into the distal end 266 of tube 212 and allow gas to egress into the proximal end 268 of tube 212. A breaker plate 214 may be positioned at the distal end 266 of measurement tube 212. In some embodiments, breaker plate 214 may comprise two or more plates. A portion 214' of breaker plate may be formed to extend into a port (not shown) in the lower portion of vessel 48.

Figure 12:
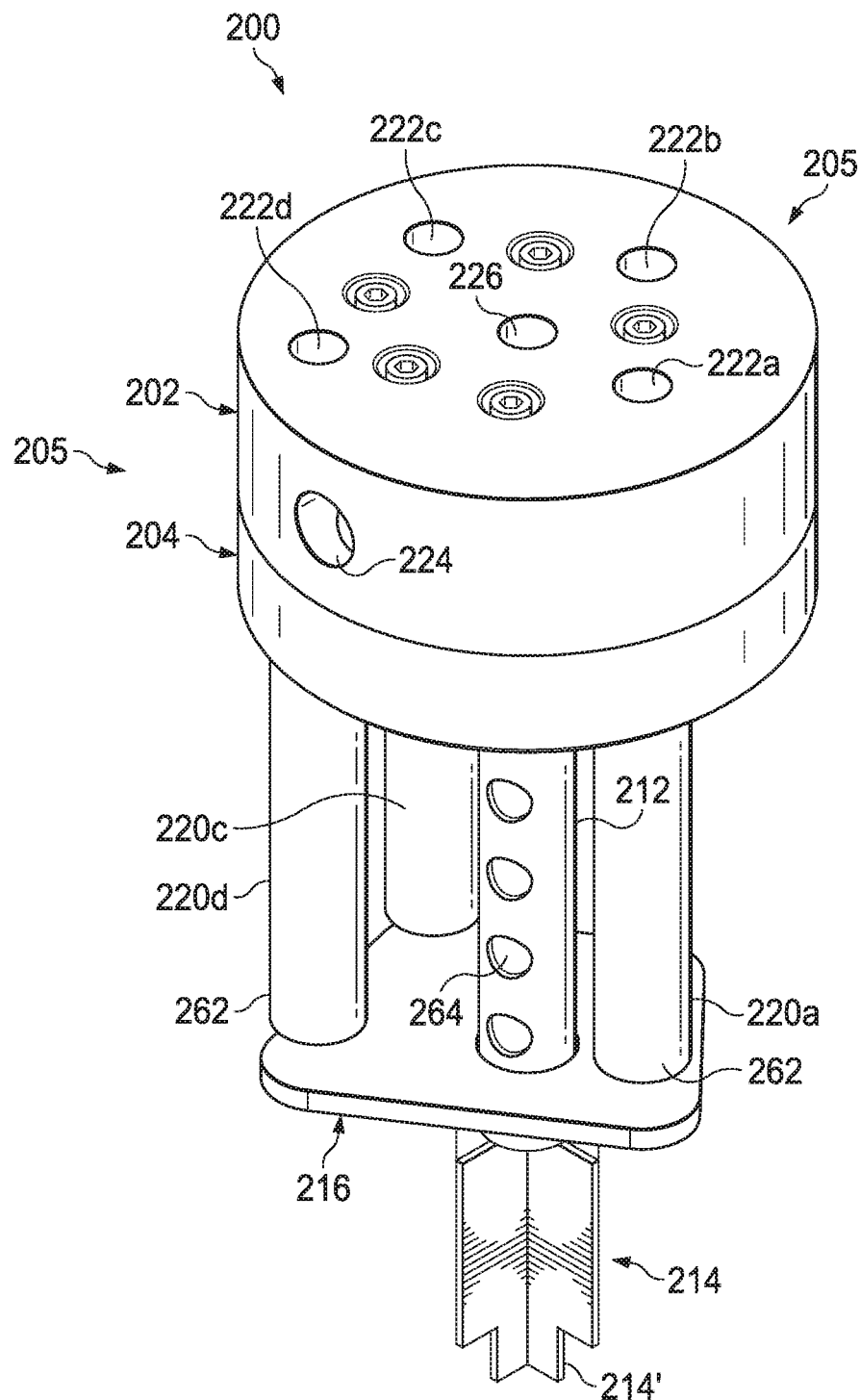
FIG. 12 is a perspective view of a vortex cluster system of FIG. 8 with a breaker plate.
Figure 13A:
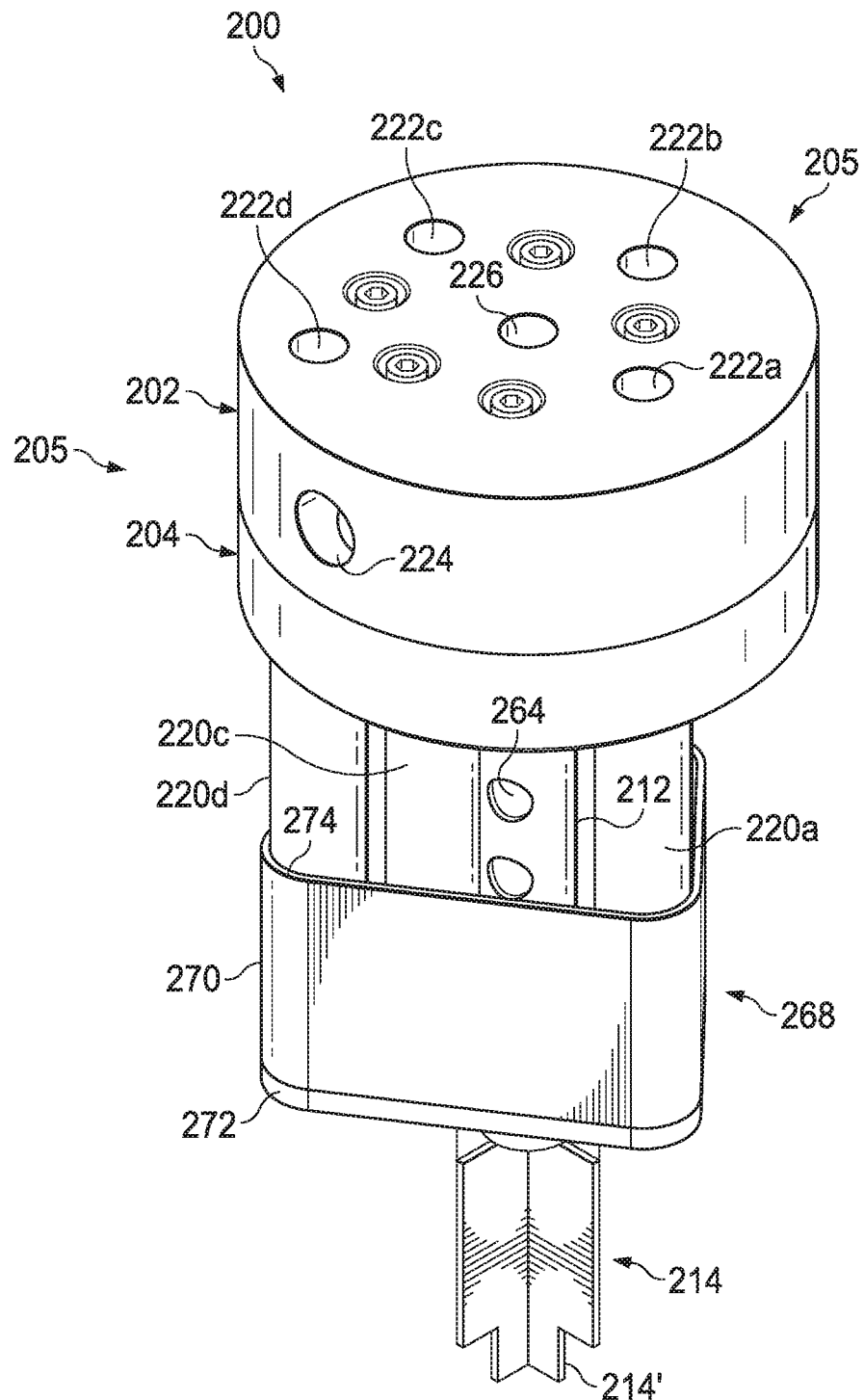
FIG. 13a is an elevation view of the vortex cluster system of FIG. 8 with a fluid receptacle.
Figure 13B:
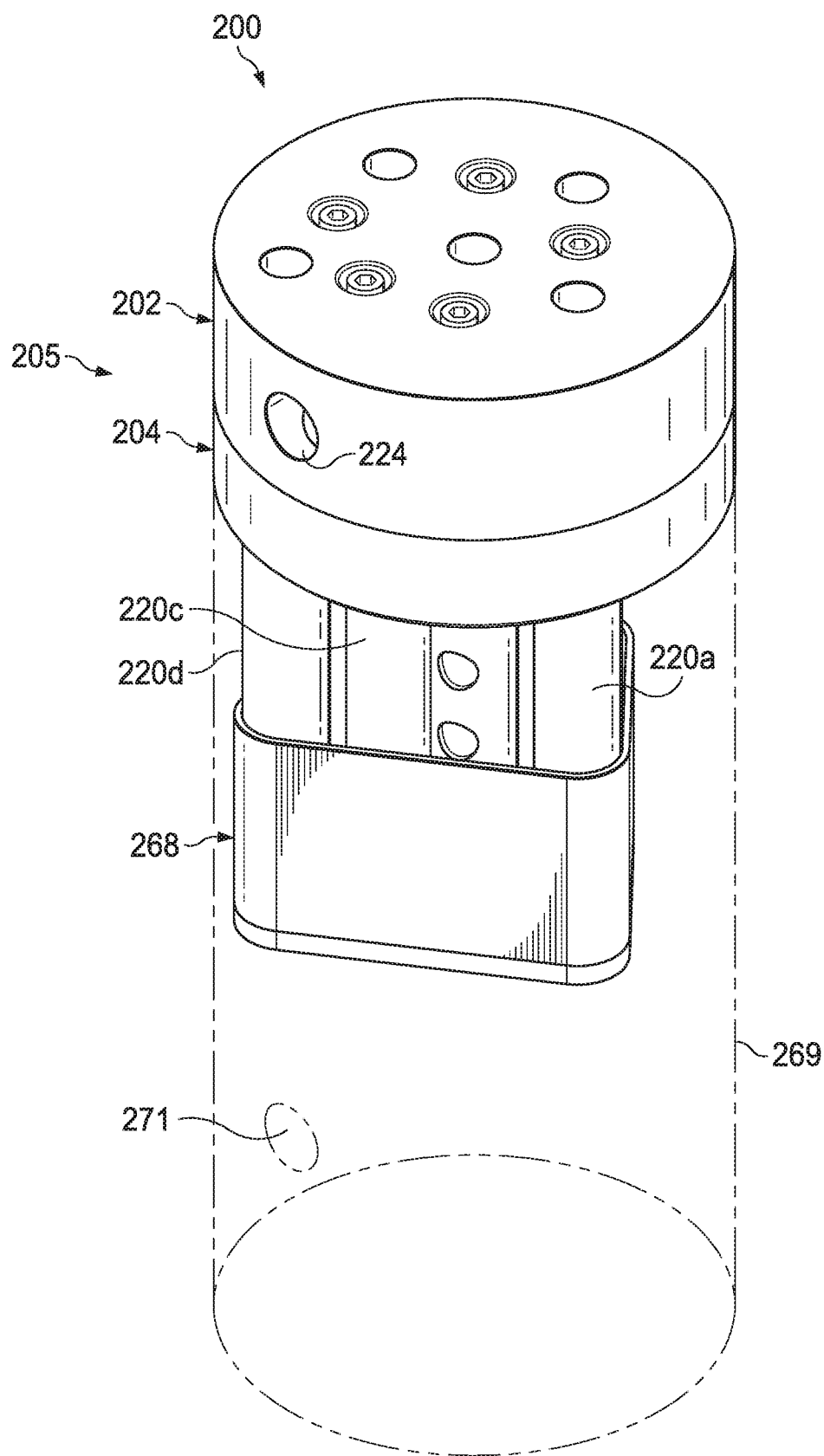
FIG. 13b is an elevation view of the vortex cluster system of FIG. 8 as a standalone system.

FIGS. 12 and 13a and 13b are similar to FIGS. 10 and 11 and illustrate other embodiments of annular vortex cluster assembly 200. Annular vortex cluster assembly 200 includes a vortex housing 205 generally having an upper portion 202, such as a top plate, and a lower portion 204, such as a vortex body, formed about a central axis 207. In one or more embodiments, vortex housing 205 may be disk-shaped. Extending down from housing 205, and in particular, lower portion 204, are two or more vortex tubes 220, such as vortex tubes 220a, 220b and 220c. Vortex tubes 220 are each in fluid communication with an aperture 222 extending through top plate 202. In particular, in some embodiments, each vortex tube 220 may communicate with a separate, but corresponding aperture 222 formed in top plate 202. Each tube has a proximal end 260 adjacent body 204 and a distal end 262. While vortex tubes 220 are shown as generally straight tubes, in other embodiments, vortex tubes 220 may be tapered to gradually narrow or gradually expand along the length of the tube 220 between ends 260 and 262.

A fluid inlet 224 is provided to permit fluid to flow into the interior of vortex housing 205. In some embodiments, fluid inlet 224 is formed in top plate 202 as shown, while in other embodiments, fluid inlet 224 may be disposed in the side of vortex body 204 (see FIG. 8). In some embodiments, fluid inlet 224 is formed in the top surface 225 of top plate 202 as shown, while in other embodiments, fluid inlet 224 may be disposed in the side of top plate 202 (see FIG. 8), or alternatively, in vortex body 204. An exhaust port 226 is shown formed in the top plate 202, which exhaust port 226 may be coaxial with central axis 207.

Although not necessary for the operation of annular vortex cluster system 200, in some embodiments, a measurement tube 212 may extend down from body 204. This is particularly true where annular vortex cluster system 200 is deployed in a vessel, such as vessel 48 of FIG. 7. Measurement tube 212 may include one or more apertures 264 along at least a portion of its length to allow liquid egress into the distal end 266 of tube 212 and allow gas to egress into the proximal end 268 of tube 212. A breaker plate 214 may be positioned at the distal end 266 of measurement tube 212. In some embodiments, breaker plate 214 may comprise two or more plates. A portion 214' of breaker plate may be formed to extend into a port (not shown) in the lower portion of vessel 48.

As shown in FIG. 12, a diverter plate 216 may positioned adjacent but spaced apart from the distal end 262 of vortex tubes 220 to eliminate the natural downward vortices from each vortex tube 220. In one or more embodiments, as shown in FIGS. 13a and 13b, a receptacle 268 may be provided into which vortex tubes 220 extend. Receptacle 268 includes a receptacle wall 270 and a receptacle base 272 which may be diverter plate 216 described above. As liquid exits vortex tubes 220, the liquid will collect in receptacle 268 and eventually spill over the top edge 274 of receptacle 268, thereby further promoting separation of remaining gas that may be in fluid exiting tubes 220.

It will be appreciated that while annular vortex cluster assembly 200 is generally presented as part of two-phase flow separator system 40 having a curvilinear flow line 70, in other embodiments, annular vortex cluster assembly 200 may function as a standalone two-phase flow separator system. In this regard, as shown in FIG. 13b, annular vortex cluster assembly 200 may include a vessel 269 into which liquid from vortex tubes 220 may accumulate. Vessel 269 may include a liquid outlet port 271. In one or more embodiments, vessel 269 may be positioned adjacent or about the distal end 262 of vortex tubes 220. Vessel 269 may extend down from housing 205. In other embodiments, vessel 269 may be a vessel, such as vessel 48 described above, (but without the curvilinear loops 60 and riser 94), in which case, housing 205 and vortex tubes 220 may be enclosed in vessel 269.

Figure 14:
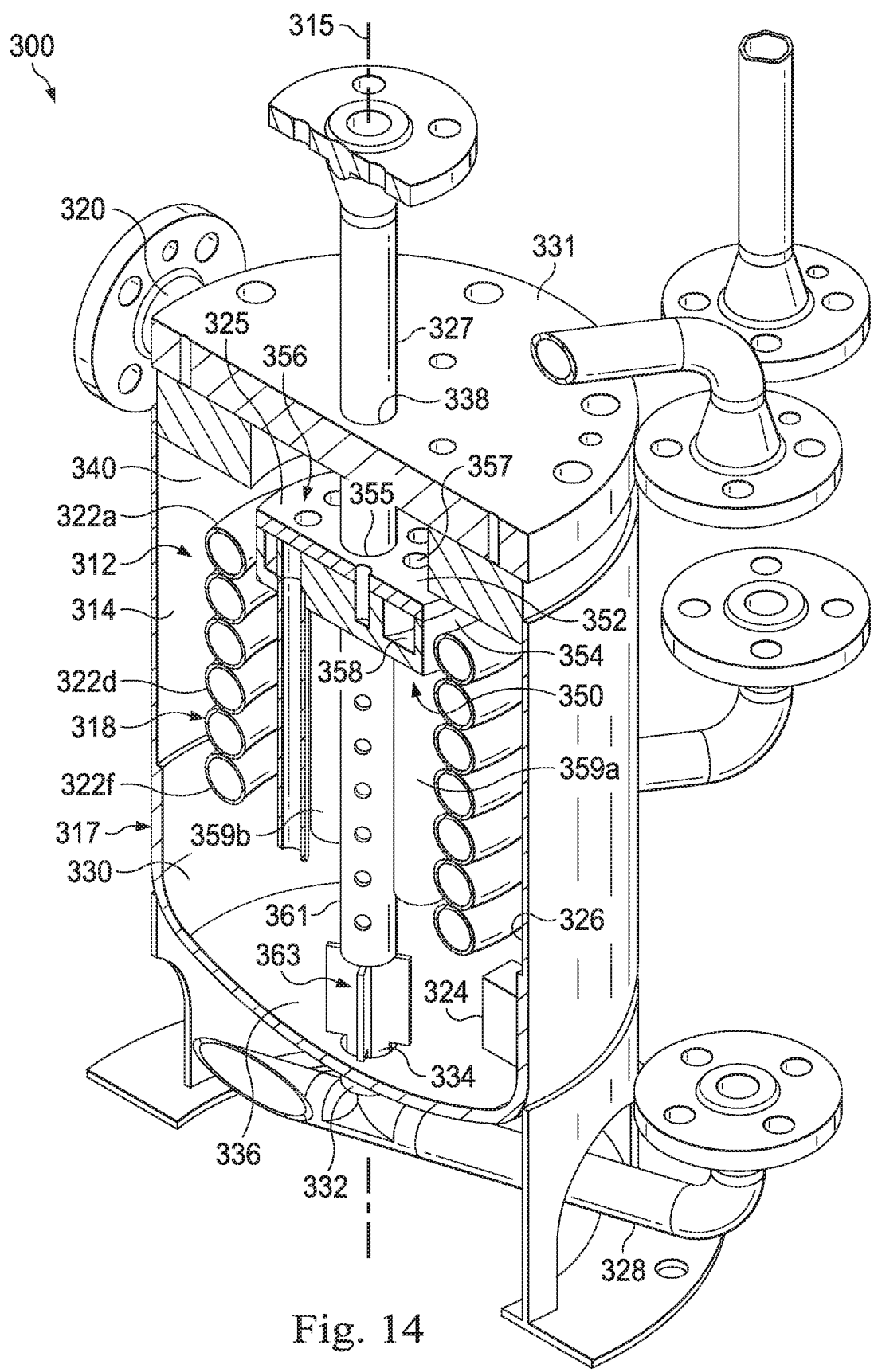
FIG. 14 is cut-away perspective view of another embodiment of a two-phase flow separator system, in which a curvilinear flow line system is combined with an annular vortex cluster system.
Figure 15:
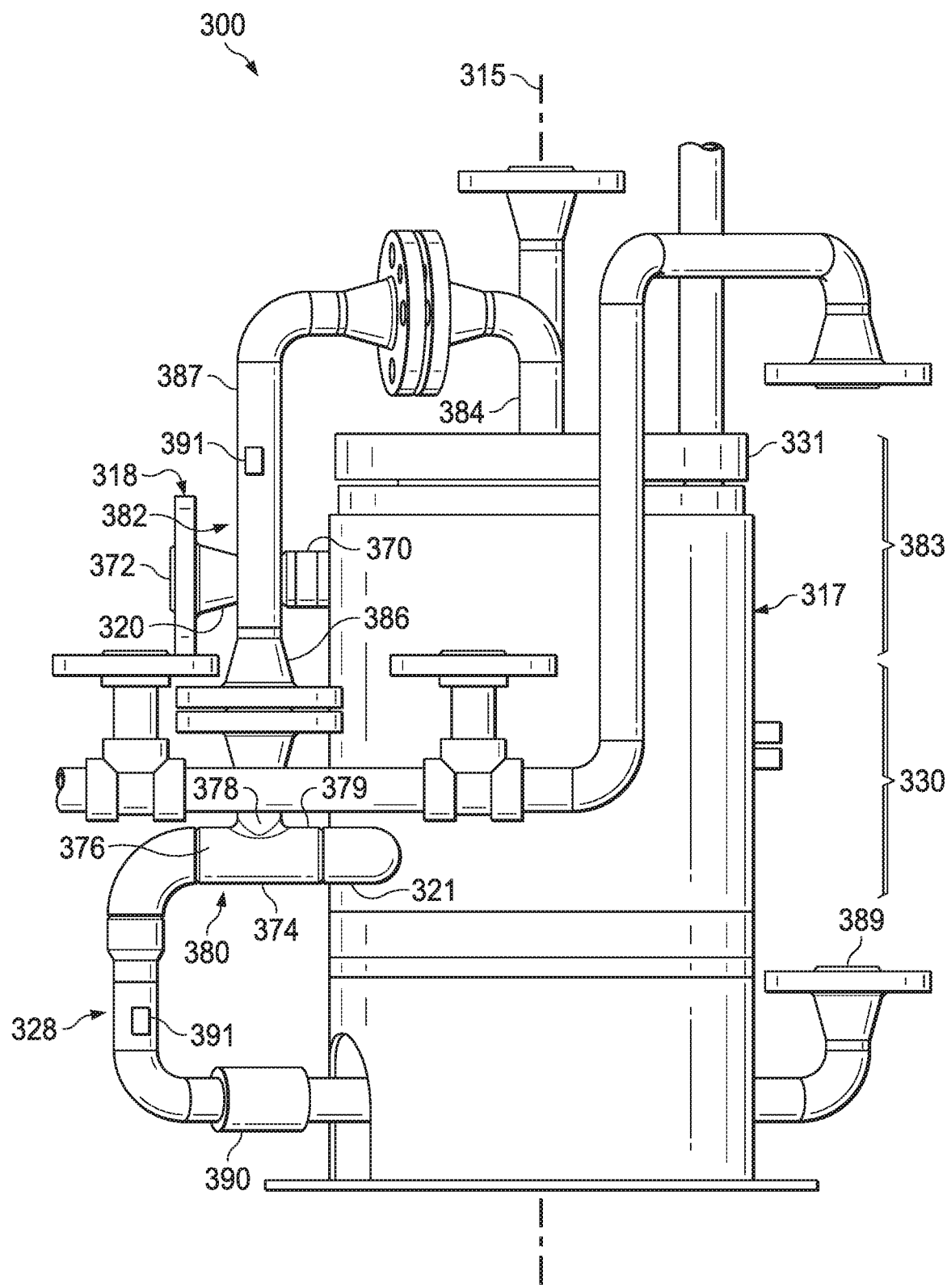
FIG. 15 is an elevation view of the two-phase flow separator system of FIG. 14.

Turning to FIGS. 14 and 15, a two-phase flow separator system 300, similar to two-phase flow separator system 40 described in FIG. 1 is shown, however in two-phase flow separator system 300, a curvilinear flow line 312 is disposed within the interior 314 of a fluid vessel 317 which is formed along a substantially vertical axis 315. Vessel 317 includes a vessel cover 331. The curvilinear flow line 312 has a first pipe 318 having a first end 320 and a second end 321. Between first end 320 and second end 321, first pipe 318 forms a plurality of curvilinear pipe loops 322a, 322b, 322c, 322d, 322e, 322f and 322g arranged adjacent one another about substantially vertical axis 315. In the illustrated embodiment, seven loops 322 are shown, however, a fewer or greater number of loops 322 may be utilized, although at least two loops are preferable. In one or more embodiments, at least a portion of the curvilinear pipe loops 322 are of the same diameter and the pipe loops 322 are adjacent one another in a vertically stacked arrangement such that each curvilinear pipe loop 322 is substantially horizontal along axis 315. In the illustrated embodiment, pipe loops 322 are disposed within vessel 317. By positioning pipe loops 322 within the interior of vessel 314 (as opposed to disposed about the exterior of vessel 48 as shown in FIG. 1), pipe loops 322 may be better insulated from external temperatures that could impact the stratification of a two-phase fluid within the loops as described herein. In this regard, vessel wall 326 may be may be insulated for such purposes. Additionally, two-phase flow separator system 300 may include a heading device 324 which may be positioned to regulate fluid temperature within the interior 314 of vessel 317. Moreover, in addition to minimizing the impact of external temperatures on two-phase stratification, vessel 317 may likewise be utilized to protect loops 322 from physical damage.

A liquid flow line 328 may extend adjacent the lower portion 330 of vessel 317. Liquid flow line 328 may include a first outlet 332. In fluid communication with a lower portion 330 of vessel 317, and a second outlet (not shown), downstream of first outlet 332. First outlet 332 may be in fluid communication with a liquid port 334 located in the bottom or lowest end 336 of vessel 317.

In one or more embodiments, a backpressure device (not shown) may be positioned along liquid flowline 328 as described above.

In any event, first pipe 318 may include a substantially horizontal portion 370 at the first end 320 terminating in an inlet 372. Similarly, first pipe 318 may include a substantially horizontal portion 374 at the second end 321 terminating in a liquid outlet 376. In one or more embodiments, the first end 370 is positioned above the second end 321 relative to vertical axis 315. As such, pipe loops 322 are descending in that fluid flow from first end 370 to second end 321 flows downward. In addition, a gas outlet port 378 is disposed along the first pipe 318 along the horizontal portion 374. The gas outlet port 378 is preferably disposed along the upper pipe surface 379 of the horizontal portion 374. Gas outlet port 378 and liquid outlet 376 may be adjacent one another such that horizontal portion 374 forms a "T" junction 380 along pipe 318.

Extending upward from gas outlet port 378 is a riser 382. In one or more embodiments, riser 382 is in fluid communication with fluid vessel 317 such that fluid vessel 317 functions as a gas separator into which fluid (typically wet gas) flowing up along riser 382 can be collected. In this regard, riser 382 is in fluid communication with an upper portion 383 of fluid vessel 317 via a port 384 in fluid communication with the upper portion 383. More specifically, riser 382 may be substantially vertical and may be substantially parallel with vertical axis 315. Riser 382 may have a first lower end 386 in fluid communication with the gas outlet port 378 and a second upper end 387 in fluid communication with fluid vessel 317. In this regard, riser 382 may be in fluid communication with an upper portion 383 of fluid vessel 317.

A liquid flow line 328 extends from liquid outlet 376. Liquid flow line 328 includes a first outlet 332 in fluid communication with a lower portion 330 of vessel 317, and a second outlet 389, downstream of first outlet 332. First outlet 332 may be in fluid communication with a liquid port 334 located in the bottom or lowest end 336 of vessel 317.

In one or more embodiments, a backpressure device 390 may be positioned along liquid flowline 328 upstream of the first outlet 334, between outlet 376 of first pipe 318 and first outlet 334 of flowline 328. Backpressure device 390 may be any mechanism which can be actuated as desired to adjust or regulate the pressure of the fluid flowing along liquid flow line 328, including without limitation a valve, such as a gate valve or other valves well known in the industry. In this regard, a sensor 391 may be provided to measure a condition of the fluid flowing along either riser 382 or liquid flow line 328 or both, which sensor(s) 391 may be utilized to adjust backpressure device 390 to optimize two-phase separation as described. In particular, it will be appreciated that backpressure device 390 impedes or slows the flow out of liquid through outlet 376 of first pipe 318 in order to create a wave of liquid within first pipe 318 downstream of gas outlet port 378 which enhances flow of the separated primarily gaseous component into riser 382.

In the depicted embodiment, vessel 317 has an inner vessel diameter Div. In any event, in this embodiment of two-phase flow separator system 300, pipe loops 322 are arranged within the interior 314 of vessel 317. Thus, pipe loops 322 may have an outer loop diameter Dol which is less than inner vessel diameter Div. As such, loops 322 are protected by the exterior wall 326 of vessel 317. This is particularly desirable in harsh environments, such as in use of two-phase flow separator system 300 in the oil field to separate liquid hydrocarbons from gaseous hydrocarbons produced from a wellbore. Likewise, positioning loops 322 within vessel 317 reduces the likelihood that environmental factors such as heat or cold will impact separation or stratification of gas and liquid components as a two-phase fluid travels along the a curvilinear flow line 312. In other words, the vessel 317 itself and the fluids therein insulate curvilinear flow line 312.

In any event, in addition to the liquid port 334 located in the bottom or lowest end 330 of vessel 317, a gas port 338 may be disposed in the top or upper end 340 of vessel 317.

In some embodiments, two-phase flow separator system 300 may further include an air relief mechanism (not shown) as described above with respect to FIG. 1.

While not necessary, in some embodiments, vessel 317 with interior curvilinear flow line 312 may further include an annular vortex cluster system 350, also shown disposed within vessel 317. Annular vortex cluster system 350 may include any of the features described above with respect to FIGS. 7-13.

Annular vortex cluster system 350 generally includes an upper portion or top plate 352 and a lower portion or vortex body 354 forming a housing 356 in which is formed an annular channel 358. Annular channel 358 may be spiral shaped. Annular channel 358 may have a cross-sectional areal that gradually narrows along the length of the channel 358. In one or more embodiments, housing 356 may be disk-shaped. Extending down from housing 356 are two or more vortex tubes 359, such as vortex tubes 359a, 359b illustrated in FIG. 14. Vortex tubes 359 are each in fluid communication with an aperture 357 extending through top plate 352. Likewise, an exhaust channel 355 may extend through body 358 and top plate 352 to allow gas to flow between the interior of vessel 317 and the exterior of vessel 317, such as via gas port 338.

In one or more embodiments, annular vortex cluster system 350 is disposed in the upper portion 383 of vessel 317. In particular, annular channel 358 is in fluid communication with riser 138 so that the primarily gaseous fluid passing therethrough enters gradually narrowing spiral channel 358 in order to flow through annular vortex cluster system 350 to further enhance separation of gas from liquid entrained in the primarily gaseous fluid flow.

Although not necessary for the operation of annular vortex cluster system 350 or two-phase flow separator system 300, in some embodiments, a measurement tube 361 may extend down from body 358 towards liquid port 334. A breaker plate 363 may be positioned at the distal end of measurement tube 361, so as to be generally adjacent liquid port 334. Breaker plate 363 is provided to prevent a vortex from forming in liquid disposed in the lower portion 330 of vessel 317.

Figure 16:
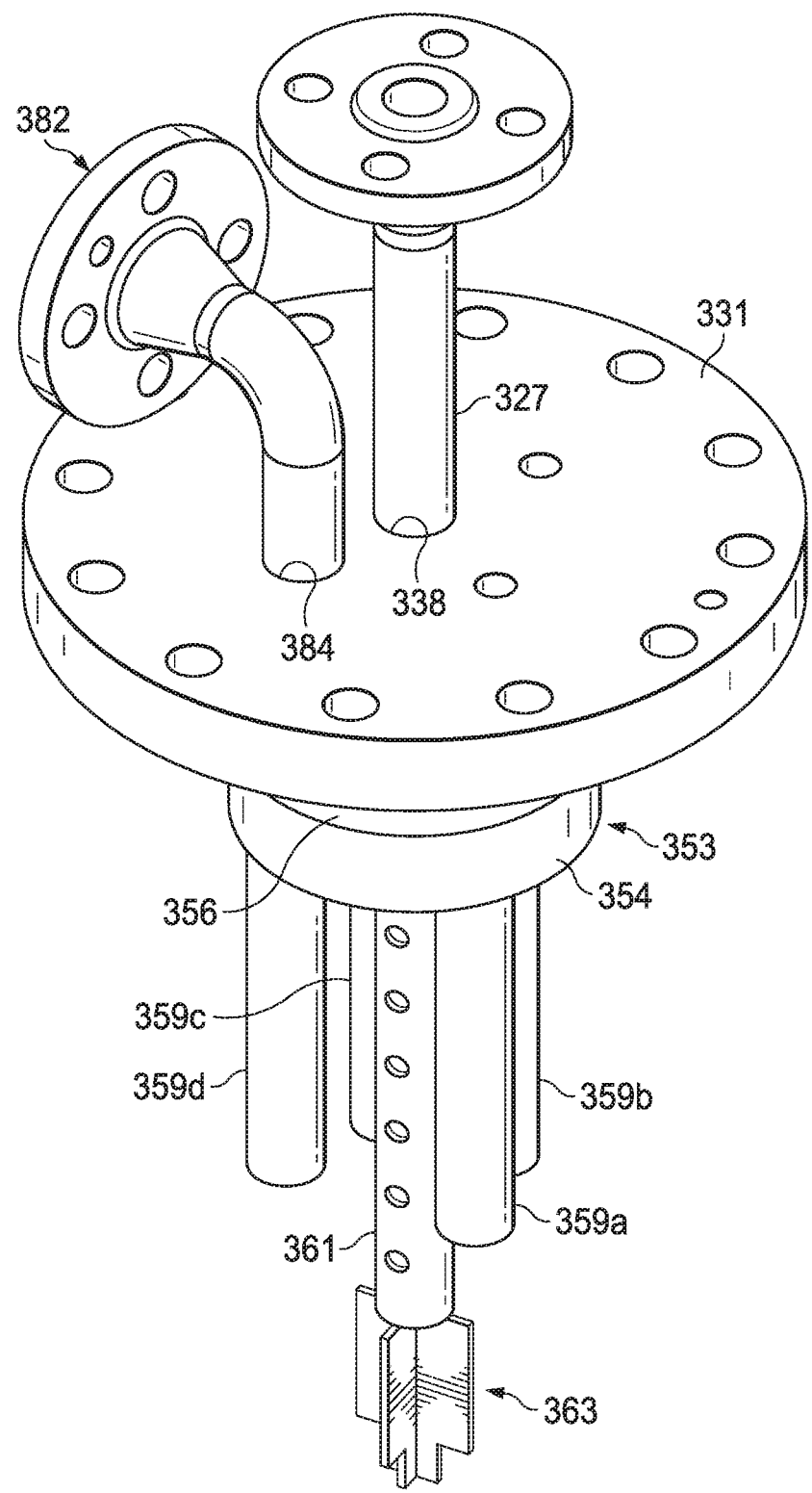
FIG. 16 is a perspective view of the top plate of a two-phase flow separator of FIG. 14.

FIG. 16 is an assembly view of the vortex cluster system 350 integrated with vessel cover 331 to allow the entire vortex cluster system 350 to be easily removed from a vessel (not shown) for servicing as desired. Vortex cluster system 350 is shown in relation to a vessel cover 331. In this particular assembly vortex cluster system 350 includes a disk-shaped housing 353 having a body 354 to which is attached a top plate 352. Extending down from housing 353 are two or more vortex tubes 359, such as vortex tubes 359a, 359b, 359c and 359d. While vortex tubes 359 are shown as generally straight tubes, in other embodiments, vortex tubes 359 may be tapered to gradually narrow or gradually expand along the length of the tube 359.

A gaseous fluid supply line, namely riser 382, extends through port 384 in vessel cover 331 and is in fluid communication with a fluid inlet (not shown) formed in the top surface 325 of top plate 352 (see FIG. 14). Likewise a gas release line 327 extends through port 338 in vessel cover 331 and is attached to an exhaust port (not shown) in the top surface 325 of top plate 352. A measurement tube 361 is shown extending down from body 354. A breaker plate 363 may be positioned at the distal end of measurement tube 361. The assembly as described can be readily removed from a vessel by simply detaching vessel cover 331 from the vessel.

Figure 17:
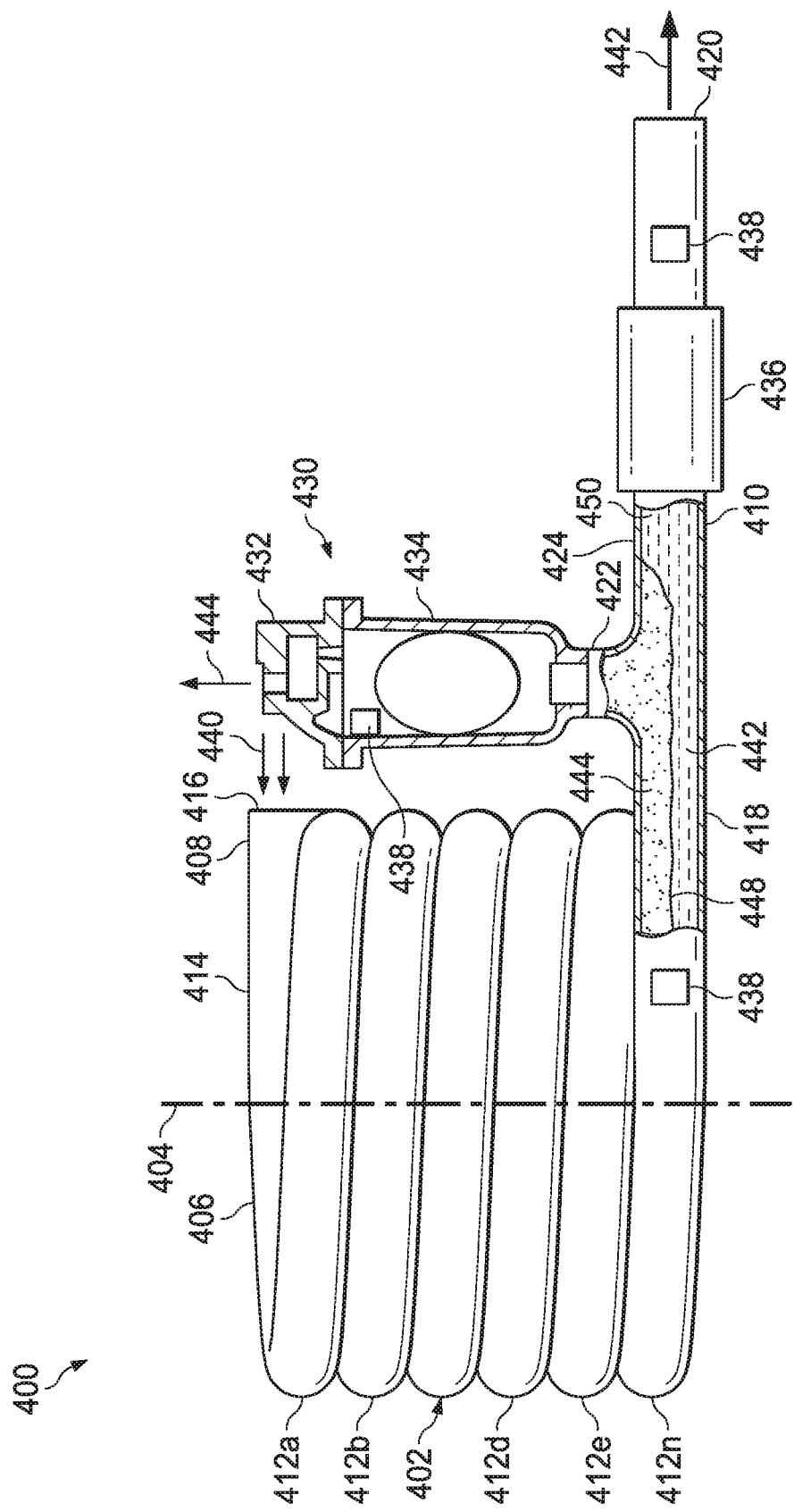
FIG. 17 is another embodiment of a two-phase flow separator.

With reference to FIG. 17, another embodiment of a two-phase flow separator system 400 is illustrated. As used herein, "two-phase" refers to a fluid with at least one gaseous component and at least one liquid component, although the fluid may have more than one gaseous or liquid component. This embodiment is similar to the two-phase flow separator system 40 described above in FIG. 1 utilizing a backpressure device, but without the fluid vessel. Specifically in two-phase flow separator system 400, a curvilinear flow line 402 is disposed about substantially vertical axis 404. The curvilinear flow line 402 has a first pipe 406 having a first end 408 and a second end 410. Between first end 408 and second end 410, pipe 406 forms a plurality of curvilinear pipe loops 412a, 412b, 412c, ... 412n arranged adjacent one another about substantially vertical axis 404. In the illustrated embodiment, five loops 412 are shown, however, a fewer or greater number of loops 412 may be utilized, although at least two loops are preferable. In one or more embodiments, at least a portion of the curvilinear pipe loops 412 are of the same diameter and the pipe loops 412 are adjacent one another in a vertically stacked arrangement such that each curvilinear pipe loop 412 is substantially horizontal. In any event, first pipe 406 may include a substantially horizontal portion 414 at the first end 408 terminating in an inlet 416. Similarly, first pipe 406 may include a substantially horizontal portion 418 at the second end 410 terminating in a liquid outlet 420. First end 408 is positioned above the second end 410 relative to vertical axis 404. As such, pipe loops 412 are descending in that fluid flow from first end 408 to second end 410 flows downward. In addition, a gas outlet port 422 is disposed along the first pipe 406 along the horizontal portion 418. The gas outlet port 422 is preferably disposed along the upper pipe surface 424 of the horizontal portion 418.

In one or more embodiments extending upward from gas outlet port 422 is a mechanical air relief mechanism 430. Air relief mechanism may simply be a valve 432 that releases air passing through port 422, or may include a gas collection vessel 434 to capture gas passing up through port 422, and controllably release gas collected in vessel 434 via valve 432.

Figure 18:
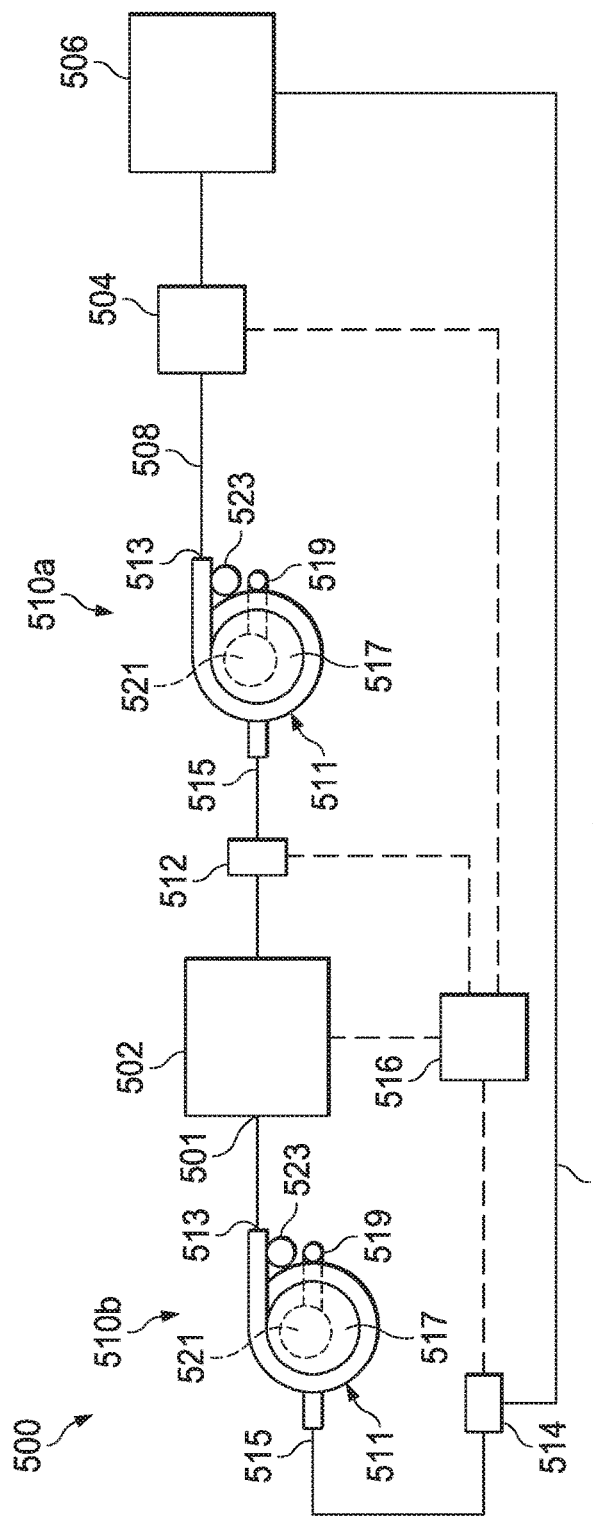
FIG. 18 illustrates a two-phase flow separator in a system for monitoring fuel combustion by an engine.

In any event, two-phase flow separator system 400 further includes a backpressure device 436 be positioned along flow line 402 between gas outlet port 422 and liquid outlet 420. Backpressure device 436 may be any mechanism which can be actuated as desired to adjust or regulate the pressure of the fluid flowing along flow line 402, including without limitation a restriction, a valve, such as a gate valve or other valve know in the industry, or the like. In this regard, a sensor 438 may be provided to measure a condition of the fluid flowing through gas outlet port 422 or through liquid outlet 420, or both, which sensor(s) 438 may be utilized to adjust backpressure device 436 to optimize two-phase separation as described. In particular, it will be appreciated that backpressure device 436 impedes or slows the flow liquid through outlet 420 in order to create a wave of liquid within first pipe 406 downstream of gas outlet port 422 which enhances flow of the separated primarily gaseous component into through port 422. Specifically as illustrated in FIG. 17, a two-phase fluid 440 enters curvilinear flow line 402 at inlet 416 and passes through the plurality of stacked, horizontal pipe loops 402, which stratifies the fluid 440 into a substantially liquid portion 442 and a substantially gaseous portion 444. Horizontal portion 418 of flow line 402 allows the permits the gaseous portion 444 to collect in the upper portion of first pipe 406 adjacent upper surface 424 and the liquid portion 442 to collect in the lower portion of first pipe 406 as the stratified flow is illustrated at 448. While liquid portion 442 flows out of outlet 420, backpressure device 436 slows down the flow of liquid portion 442 therethrough, resulting in a liquid wave 450 which forms in first pipe 406 downstream of gas port 422. Liquid wave 450 promotes the flow of gaseous portion 444 into gas port 422, allowing gaseous portion 444 to be bled off from the liquid portion 442. Sensor(s) 438 may be utilized to measure a condition of one or more of the fluids 440, 442, 444 which can then be used to adjust backpressure device 436. Turning to FIG. 18, in one application, the above described two-phase flow separator system may be used to measure fuel combustion/consumption of an engine. Shown in FIG. 18 is a engine system 500 for measuring fuel combustion or consumption by an engine 502, such as an internal combustion engine. Specifically, a fuel pump 504 pumps fuel along a fuel supply line 508 from a fuel vessel 506 to engine 502. A first two-phase flow separator system 510a, as described herein is disposed along the fuel line 508 upstream of the engine 502 to remove air from liquid fuel prior to injection of the liquid fuel into the engine 502. Upon treatment of the fuel by first separator system 510a, a sensor 512 measures a property of the fuel, such as volume of liquid fuel delivered to engine 502, after which, the fuel is injected into the engine 502. In some embodiments, a pump may also be provided downstream of second two-phase flow separator system 510b to draw combustion fluid flow into second two-phase flow separator system 510b, or alternatively incorporated into second two-phase flow separator system 510b to draw fluid flow into the system. Thereafter exhaust from the engine is directed to a second two-phase flow separator system 510b where the combustion gases are separated from uncombusted liquid fuel. A sensor 514 measures a property of the fuel, such as the volume of uncombusted liquid fuel. The amount of fuel injected into the engine 502 as measured by sensor 512 and the amount of uncombusted fuel as measured by sensor 514 can then be compared to optimize operation of engine 502. In this regard, a controller 516 may be provided to receive data from sensors 512 and 514 and compare the data. Controller 516 may also be utilized to make adjustments to engine 502 and/or pump 504 in response to the comparison, such as altering the amount of liquid fuel injected into a combustion chamber (not shown) of engine 502 or altering the amount of combustion air mixed with the liquid fuel of engine 502 or adjusting the flow rate of pump 504. Likewise, controller 516 may also receive data and/or control operation of one or both separator systems 510 as generally described herein in order to optimize operation of each by adjusting flowrate into separator system 510 as well as back pressure applied to liquid fuel stream within each separator system 510.

Two-phase flow separator systems 510a and 510b each generally includes a curvilinear flow line 511 having an inlet 513 and an outlet 515. Inlet 513 of separator system 510a is in fluid communication with fuel vessel 506 to deliver fluid as an inlet fluid to flow separator system 510a and outlet 515 of separator system 510a is in fluid communication with engine 502 to deliver combustion fuel to engine 502. Similarly, inlet 513 of separator system 510b is in fluid communication with the exhaust port 501 of engine 502 to deliver combustion fluid flow as an inlet fluid to flow separator system 510b and outlet 515 of separator system 510b is in fluid communication with fuel vessel 506. Curvilinear flow line 511 forms a plurality generally horizontal, stacked curvilinear pipe loops adjacent one another which are disposed about a vessel 517 forming a component of flow separator system 510. A riser 519 delivers gaseous fluid removed from the inlet fluid by curvilinear flow line 511 into vessel 517. Flow separator system 510 may include a vortex cluster system 521. Flow separator system 510 may further include an air relief mechanism 523 for maintaining a desired liquid level within vessel 517 and to dampen the downstream impact of inlet fluid flow fluctuations into flow separator system 510. A vacuum pump may be provided along flow line 511 to draw fluid flow into inlet 513.

As more specifically described above, one or both two-phase flow separator systems 510 include a curvilinear flow line system which may include a fluid vessel to improve operation of the curvilinear flow line system, separating a two-phase fluid into a primarily liquid component and a primarily gaseous component. The first separator system 510a separates fuel flow from fuel vessel 506 into liquid fuel and air. The second separator system 510b separates exhaust flow from engine 502 into exhaust gases and uncombusted liquid fuel. In one or more embodiments, the curvilinear flow line system is disposed around the outer perimeter of the fluid vessel, while in other embodiments, the curvilinear flow line system is disposed within the interior of the vessel or utilized without a fluid vessel. In one or more embodiments, a vortex cluster system, such as vortex cluster system 200, may be utilized to treat the primarily gaseous component, namely air in the case of the first separator system 510a and combustion gas in the case of the second separator system 510b, downstream of the curvilinear flow line system. The vortex cluster system may be positioned within the interior of a tank, while in other embodiments, the vortex cluster system may be external to a tank. In yet other embodiments, a curvilinear flow line system may be combined with the vortex cluster system of the disclosure without any tank. In this regard, in some embodiments, the vortex cluster system disclosed herein may be, on its own, a two-phase flow separator system, such as separator system 510a or 510b. For the avoidance of doubt, two-phase flow separator systems 510 may be any of the two-phase flow separator systems described in this disclosure.

Thus, in some embodiments, two-phase flow separator systems 510 may include a first pipe having a first end and a second end with the pipe forming a plurality of curvilinear pipe loops arranged adjacent one another along a substantially vertical axis. The curvilinear pipe loops are generally horizontal and formed around a vessel or within a vessel, with the first end of the first pipe disposed adjacent an upper portion of the vessel and the second end of the first pipe disposed adjacent a lower portion of the vessel. At least a portion of the curvilinear pipe loops are of the same diameter and adjacent one another in a vertically stacked arrangement. At the second end of the first pipe is a fluid outlet. A gas outlet is formed in the first pipe between the first and second ends of the first pipe. In one embodiment, the gas outlet is adjacent the fluid outlet and leads to a riser in fluid communication with the interior of a fluid vessel. In one embodiment, the pipe loops are disposed around the exterior of the fluid vessel while in other embodiments, the pipe loops are contained within the fluid vessel. A backpressure mechanism may be provided in a fluid line downstream of the fluid outlet and upstream of a port in the fluid line which port is in fluid communication with the base of the fluid vessel.

In one or more embodiments, the riser is in fluid communication with an annular vortex cluster system that generally includes a top plate secured to and a vortex body forming an internal chamber in which a gradually narrowing, spiral channel is defined about a vortex hub positioned within the internal chamber. The spiral channel has a first end and a second end and gradually narrows in width W between the first and second ends. Formed in the hub generally adjacent the periphery of the hub are two or more cut bores that intersect the spiral channel, thus forming a leading edge and a trailing edge for each cut bore. Each cut bore extends through the base of the vortex body to form an outlet in fluid communication with a vortex tube extending down from the vortex body. Each vortex tube is in fluid communication with an aperture extending through the top plate. To the extent a two-phase flow separator system 510 utilizes a fluid vessel, the annular vortex cluster system may be disposed in the upper portion of the fluid vessel.

In an alternative embodiment of the system of FIG. 18, two-phase flow separator system 510a may be eliminated and the amount of uncombusted liquid fuel may be recovered as described utilizing two-phase flow separator system 510b. While in some embodiments the recovered uncombusted fuel may simply be returned to fuel vessel 506 via a return line 518, in other embodiments, the uncombusted fuel recovered by two-phase flow separator system 510b may be analyzed, such as with sensor 514 and utilized to make adjustments to engine 502 in order to improve efficiency of engine 502.

Figure 19:
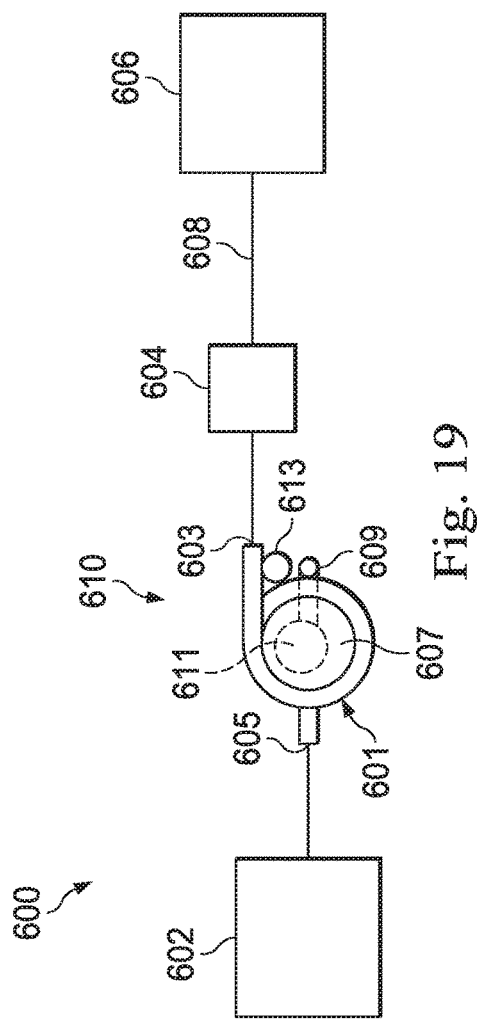
FIG. 19 illustrates a two-phase flow separator in a system for improving operation of an internal combustion engine.

Turning to FIG. 19, in another application, the above described two-phase flow separator system may be used to improve engine performance by removing air from liquid fuel prior to injection into an internal combustion engine. Shown in FIG. 19 is an engine system 600 for treating liquid fuel, such as gasoline, diesel, methanol, ethanol or other liquid fuel, prior to injection into an engine 602. Specifically, a fuel pump 604 pumps fuel along a fuel supply line 608 from a fuel vessel 606, such as a vehicle fuel tank, to engine 602 for combustion. A first two-phase flow separator system 610 as described herein is disposed along the fuel line 608 upstream of the engine 602 to remove air from liquid fuel prior to injection of the liquid fuel into the engine 602.

Two-phase flow separator system 610 generally includes a curvilinear flow line 601 having an inlet 603 in fluid communication with fuel vessel 606 to deliver fluid as an inlet fluid to flow separator system 610 and an outlet 605 directly or indirectly in fluid communication with engine 602. Curvilinear flow line 601 forms a plurality generally horizontal, stacked curvilinear pipe loops arranged adjacent one another which are disposed about a vessel 607 forming a component of flow separator system 610. A riser 609 delivers gaseous fluid removed from the inlet fluid by curvilinear flow line 601 into vessel 607. Flow separator system 610 may include a vortex cluster system 611. Flow separator system 610 may further include an air relief mechanism 613 for maintaining a desired liquid level within vessel 607 and to dampen the downstream impact of inlet fluid flow fluctuations into flow separator system 610.

As more specifically described above, one or more embodiments of two-phase flow separator system 610 includes a curvilinear flow line system which may include a fluid vessel to improve operation of the curvilinear flow line system, separating a two-phase fluid into a primarily liquid component and a primarily gaseous component. The separator system 610 separates fuel flow from fuel vessel 606 into liquid fuel and air. In one or more embodiments where a vessel is included, the curvilinear flow line system is disposed around the outer perimeter of the fluid vessel, while in other embodiments, the curvilinear flow line system is disposed within the interior of the vessel. In one or more embodiments, a vortex cluster system may be utilized to treat the primarily gaseous component, namely air, downstream of the curvilinear flow line system. The vortex cluster system may be positioned within the interior of a tank, while in other embodiments, the vortex cluster system may be external to a tank. In yet other embodiments, a curvilinear flow line system may be combined with the vortex cluster system of the disclosure without any tank. In this regard, in some embodiments, the vortex cluster system disclosed herein may be, on its own, a two-phase flow separator system, such as separator system 610. In yet other embodiments, the two-phase flow separator system 610 may be an annular vortex cluster system, as vortex cluster system 200, without any curvilinear flow line system. For the avoidance of doubt, two-phase flow separator systems 610 may be any of the two-phase flow separator systems described in this disclosure.

Thus, in some embodiments, two-phase flow separator systems 610 may include a first pipe having a first end and a second end with the pipe forming a plurality of curvilinear pipe loops arranged adjacent one another along a substantially vertical axis. The curvilinear pipe loops are generally horizontal and formed around a vessel, with the first end of the first pipe disposed adjacent an upper portion of the vessel and the second end of the first pipe disposed adjacent a lower portion of the vessel. At least a portion of the curvilinear pipe loops are of the same diameter and adjacent one another in a vertically stacked arrangement. At the second end of the first pipe is a fluid outlet. A gas outlet is formed in the first pipe between the first and second ends of the first pipe. In one embodiment, the gas outlet is adjacent the fluid outlet and leads to a riser in fluid communication with the interior of a fluid vessel. In one embodiment, the pipe loops are disposed around the exterior of the fluid vessel while in other embodiments, the pipe loops are contained within the fluid vessel. A backpressure mechanism may be provided in a fluid line downstream of the fluid outlet and upstream of a port in the fluid line which port is in fluid communication with the base of the fluid vessel.

In one or more embodiments, the riser is in fluid communication with an annular vortex cluster system that generally includes a top plate secured to and a vortex body forming an internal chamber in which a gradually narrowing, spiral channel is defined about a vortex hub positioned within the internal chamber. The spiral channel has a first end and a second end and gradually narrows in width W between the first and second ends. Formed in the hub generally adjacent the periphery of the hub are two or more cut bores that intersect the spiral channel, thus forming a leading edge and a trailing edge for each cut bore. Each cut bore extends through the base of the vortex body to form an outlet in fluid communication with a vortex tube extending down from the vortex body. Each vortex tube is in fluid communication with an aperture extending through the top plate. To the extent two-phase flow separator systems 610 utilizes a fluid vessel, the annular vortex cluster system may be disposed in the upper portion of the fluid vessel.

Figure 20:
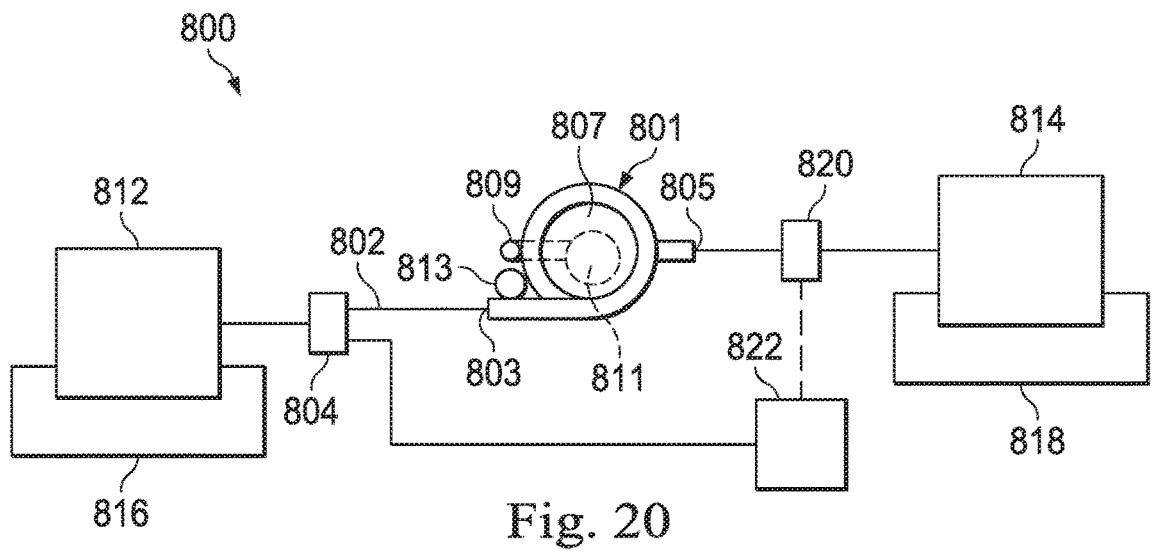
FIG. 20 illustrates a two-phase flow separator in a system for fuel bunkering operations.

Turning to FIG. 20, in another application, the above described two-phase flow separator system may be used in fuel bunkering operations to transfer fuel, such as fuel oil, from a fuel storage tank to the on-board fuel tank of a marine vessel. Bunker fuel generally refers to any type of fuel used aboard ships. Bunker fuels may be delivered to commercial ships via bunker vessels such as barges, which often hold the bunker fuel in large tanks on the vessel, or from terminals with the fuel tanks located on land. The practice of delivering bunker fuels is commonly referred to as "bunkering." The bunker fuel is typically pumped from the storage tank as may be on the bunker barge to the tanks on commercial ships. In any event, the pumping of fuel in bunkering operations, especially as the vessels containing the fuel are emptied, larger amounts of air tend to be drawn in and pumped with the fuel, rendering pumping difficult and resulting in inaccurate measurements of fuel. Shown in FIG.

20 is a two-phase flow separator system 800 disposed along a fuel line 802 between a first fuel storage tank 812 and the fuel tank to which the fuel is being pumped, namely a second fuel storage tank 814. First fuel storage tank 812 may be carried on a marine vessel, such as marine barge 816, or deployed dockside on land. Second storage fuel tank 814 is located on a ship 818. A fuel pump 804 may be utilized between first fuel storage tank 814 and two-phase flow separator system 800 to pump fuel to second fuel storage tank 814. A liquid measurement device 820, such as a sensor, may be positioned along fuel line 802 between two-phase flow separator system 800 and second fuel storage tank 814. A controller 822 may be utilized to monitor sensor 820, and in some embodiments, based on the monitored liquid, control pump 804.

Two-phase flow separator system 800 generally includes a curvilinear flow line 801 having an inlet 803 in fluid communication with first fuel storage tank 812 to deliver fuel as an inlet fluid to flow separator system 800 and an outlet 805 directly or indirectly in fluid communication with second storage fuel tank 814. Curvilinear flow line 801 forms a plurality generally horizontal, stacked curvilinear pipe loops arranged adjacent one another which are disposed about a vessel 807 forming a component of flow separator system 800. A riser 809 delivers gaseous fluid removed from the inlet fluid by curvilinear flow line 801 into vessel 807. Flow separator system 800 may include a vortex cluster system 811. Flow separator system 800 may further include an air relief mechanism 813 for maintaining a desired liquid level within vessel 807 and to dampen the downstream impact of inlet fluid flow fluctuations into flow separator system 800.

As more specifically described above, in one or more embodiments, two-phase flow separator system 800 includes a curvilinear flow line system which may be combined with a fluid vessel to improve operation of the curvilinear flow line system, separating a two-phase fluid into a primarily liquid component and a primarily gaseous component. The separator system 800 separates fuel flow from first fuel storage tank 812 into liquid fuel and air. In one or more embodiments, the curvilinear flow line system is disposed around the outer perimeter of the fluid vessel, while in other embodiments, the curvilinear flow line system is disposed within the interior of the vessel. In one or more embodiments, a vortex cluster system may be utilized to treat the primarily gaseous component, namely air, downstream of the curvilinear flow line system. The vortex cluster system may be positioned within the interior of a tank, while in other embodiments, the vortex cluster system may be external to a tank. In yet other embodiments, a curvilinear flow line system may be combined with the vortex cluster system of the disclosure without any tank. In this regard, in some embodiments, the vortex cluster system disclosed herein may be, on its own, a two-phase flow separator system, such as annular vortex cluster system 200. For the avoidance of doubt, two-phase flow separator systems 800 may be any of the two-phase flow separator systems described in this disclosure.

Thus, in some embodiments, two-phase flow separator systems 800 may include a first pipe having a first end and a second end with the pipe forming a plurality of curvilinear pipe loops arranged adjacent one another along a substantially vertical axis. The curvilinear pipe loops are generally horizontal and formed around a vessel, with the first end of the first pipe disposed adjacent an upper portion of the vessel and the second end of the first pipe disposed adjacent a lower portion of the vessel. At least a portion of the curvilinear pipe loops are of the same diameter and adjacent one another in a vertically stacked arrangement. At the second end of the first pipe is a fluid outlet. A gas outlet is formed in the first pipe between the first and second ends of the first pipe. In one embodiment, the gas outlet is adjacent the fluid outlet and leads to a riser in fluid communication with the interior of a fluid vessel. In one embodiment, the pipe loops are disposed around the exterior of the fluid vessel while in other embodiments, the pipe loops are contained within the fluid vessel. A backpressure mechanism may be provided in a fluid line downstream of the fluid outlet and upstream of a port in the fluid line which port is in fluid communication with the base of the fluid vessel.

In one or more embodiments, the miser is in fluid communication with an annular vortex cluster system that generally includes a top plate secured to and a vortex body forming an internal chamber in which a gradually narrowing, spiral channel is defined about a vortex hub positioned within the internal chamber. The spiral channel has a first end and a second end and gradually narrows in width W between the first and second ends. Formed in the hub generally adjacent the periphery of the hub are two or more cut bores that intersect the spiral channel, thus forming a leading edge and a trailing edge for each cut bore. Each cut bore extends through the base of the vortex body to form an outlet in fluid communication with a vortex tube extending down from the vortex body. Each vortex tube is in fluid communication with an aperture extending through the top plate. To the extent two-phase flow separator systems 800 utilizes a fluid vessel, the annular vortex cluster system may be disposed in the upper portion of the fluid vessel.

Thus, fuel is removed from the first tank 812, passed through system 800 and then directed to the second tank 814. The fuel entering the first end of the first pipe may have a large proportion of air included with the liquid fuel. The liquid fuel exiting the second end of the first pipe, after having passed through the plurality of curvilinear pipe loops, has been substantially scrubbed of the entrained air. Any liquid fuel entrained in the removed air can be captured by the annular vortex cluster and directed into second fuel storage tank 814.

Figure 21:
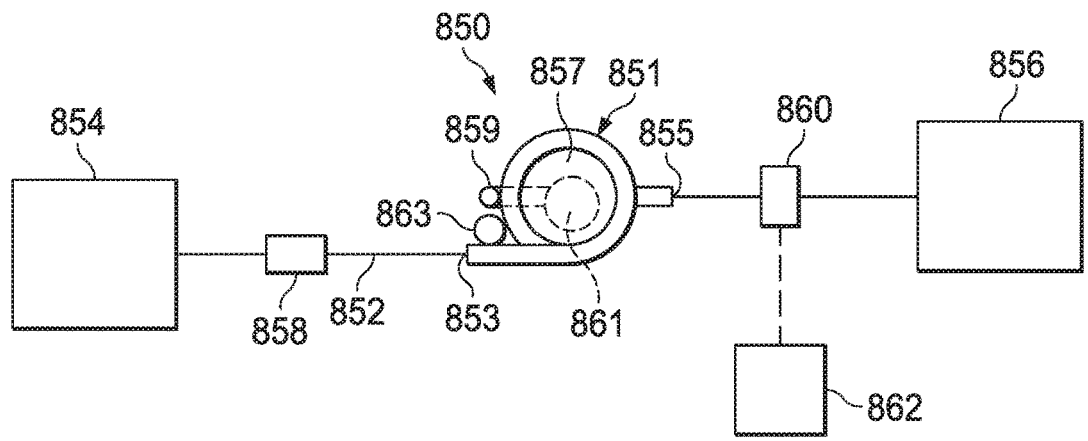
FIG. 21 illustrates a two-phase flow separator in a system for transferring liquids between tanks.

Turning to FIG. 21, in another application, the above described two-phase flow separator system may be used in the liquid transfer systems between storage tanks or vessels (on-land or marine) to ensure that the volume of liquid transferred is accurately measured. Shown in FIG. 21 is a two-phase flow separator system 850 disposed along a supply line or pipeline 852 between a first liquid storage tank 854 and a second liquid storage tank 856. As described herein one or both of first storage tank 854 and second storage tank 856 may be a carried on a vehicle such as a truck or rail car, barge or the like or be a fixed structure. Similarly, storage tanks 854, 856 may be manufactured containers or reservoirs, and may be utilized for storage of any liquid, including without limitation, chemicals, hydrocarbons, fuel, milk, or other consumable liquids. Similarly, storage tanks 854, 856 may be disposed for long term or temporary storage of liquids, or may be transitory containers or vessels of a larger manufacturing or processing system, such as a cracking tower. In any event, a liquid pump 858 may be utilized between first storage tank 854 and two-phase flow separator system 850 to pump liquid to second storage tank 856. A liquid measurement device 860, such as a sensor, may be positioned along pipeline 852 between two-phase flow separator system 850 and second storage tank 856. A controller 862 may be utilized to monitor sensor 860, and in some embodiments, based on the monitored liquid, control pump 858.

Two-phase flow separator system 850 generally includes a curvilinear flow line 851 having an inlet 853 in fluid communication with first storage tank 854 to deliver fluid as an inlet fluid to flow separator system 850 and an outlet 855 directly or indirectly in fluid communication with second storage tank 856. Curvilinear flow line 851 forms a plurality generally horizontal, stacked curvilinear pipe loops arranged adjacent one another which are disposed about a vessel 857 forming a component of flow separator system 850. A riser 859 delivers gaseous fluid removed from the inlet fluid by curvilinear flow line 851 into vessel 857. Flow separator system 850 may include a vortex cluster system 861. Flow separator system 850 may further include an air relief mechanism 863 for maintaining a desired liquid level within vessel 857 and to dampen the downstream impact of inlet fluid flow fluctuations into flow separator system 850.

As more specifically described above, a curvilinear flow line system which may be combined with a fluid vessel to improve operation of the curvilinear flow line system, separating a two-phase fluid into a primarily liquid component and a primarily gaseous component. The separator system 850 separates fluid flow from first storage tank 854 into a primarily liquid stream and a primarily gaseous stream. In one or more embodiments, the curvilinear flow line system is disposed around the outer perimeter of the fluid vessel, while in other embodiments, the curvilinear flow line system is disposed within the interior of the vessel. In one or more embodiments, a vortex cluster system 863 may be utilized to treat the primarily gaseous stream, namely air, downstream of the curvilinear flow line system. The vortex cluster system may be positioned within the interior of a tank, while in other embodiments, the vortex cluster system may be external to a tank. In yet other embodiments, a curvilinear flow line system may be combined with the vortex cluster system of the disclosure without any tank. In this regard, in some embodiments, the vortex cluster system disclosed herein may be, on its own, a two-phase flow separator system, such as annular vortex cluster system 200. For the avoidance of doubt, two-phase flow separator systems 850 may be any of the two-phase flow separator systems described in this disclosure.

Thus, in some embodiments, two-phase flow separator system 850 may include a first pipe having a first end and a second end with the pipe forming a plurality of curvilinear pipe loops arranged adjacent one another along a substantially vertical axis. The curvilinear pipe loops are generally horizontal and may be formed around a vessel, with the first end of the first pipe disposed adjacent an upper portion of the vessel and the second end of the first pipe disposed adjacent a lower portion of the vessel. At least a portion of the curvilinear pipe loops are of the same diameter and adjacent one another in a vertically stacked arrangement. At the second end of the first pipe is a fluid outlet. A gas outlet is formed in the first pipe between the first and second ends of the first pipe. In one embodiment, the gas outlet is adjacent the fluid outlet and leads to a riser in fluid communication with the interior of a fluid vessel. In one embodiment, the pipe loops are disposed around the exterior of the fluid vessel while in other embodiments, the pipe loops are contained within the fluid vessel. A backpressure mechanism may be provided in a fluid line downstream of the fluid outlet and upstream of a port in the fluid line which port is in fluid communication with the base of the fluid vessel.

In one or more embodiments, the riser is in fluid communication with an annular vortex cluster system that generally includes a top plate secured to and a vortex body forming an internal chamber in which a gradually narrowing, spiral channel is defined about a vortex hub positioned within the internal chamber. The spiral channel has a first end and a second end and gradually narrows in width W between the first and second ends. Formed in the hub generally adjacent the periphery of the hub are two or more cut bores that intersect the spiral channel, thus forming a leading edge and a trailing edge for each cut bore. Each cut bore extends through the base of the vortex body to form an outlet in fluid communication with a vortex tube extending down from the vortex body. Each vortex tube is in fluid communication with an aperture extending through the top plate. To the extent two-phase flow separator system 850 utilizes a fluid vessel, the annular vortex cluster system may be disposed in the upper portion of the fluid vessel.

Thus, liquid is removed from the first tank 854, passed through system 850 and then directed to the second tank 856. The liquid entering the first end of the first pipe may have a large proportion of air included with the liquid which air may have been entrained in the liquid through various processes, such as through manufacturing or treatment of the liquid or simply handling of the liquid. The liquid exiting the second end of the first pipe, after having passed through the plurality of curvilinear pipe loops, has been substantially scrubbed of the entrained air. Any liquid entrained in the removed air can be captured by the annular vortex cluster and directed into second storage tank 814.

Figure 22:
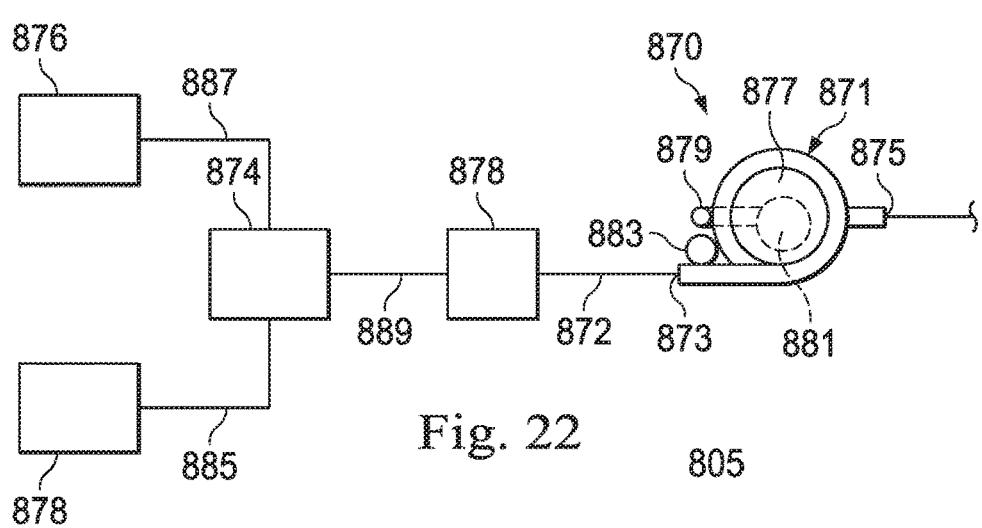
FIG. 22 illustrates a two-phase flow separator in a system utilized in a manufacturing process.

Turning to FIG. 22, in another application, the above described two-phase flow separator system may be used in the processing of chemicals or the manufacture of chemicals or food products. Specifically, the two-phase flow separator system may be used to remove gas from any liquid component to improve purity or product quality. As an example, in the processing of milk, the presence of air can negatively impact the taste of the milk. The presence of air in milk can also decrease the longevity of the milk before spoilage. Relatedly, entrained gas or air in a fluid that is exposed to heat during the manufacturing processes may expand during heating, impacting the quality of the final product being manufactured. For these reasons, it is desirable to utilize the described two-phase flow separator system to remove gas entrained in the manufacturing fluid. Shown in FIG. 22 is a two-phase flow separator system 870 disposed along a conduit 872 downstream of a processor 874. Processor 874 may be disposed to mix or blend a liquid from a liquid storage tank 876 and an additive from an additive source 878, such as a storage vessel. The additive may be a solid, such as a food component, or another liquid, such as a chemical. The liquid storage tank 876 is in fluid communication with the processor 874 via a liquid supply line 887. In the case where the additive is a solid, a solid delivery system 885, such as a conveyor or auger, may be utilized to supply a solid from the additive source 878 to the processor 874. In this regard, processor 874 may be a blender used in various food manufacturing or preparation, or chemical manufacturing. Mixing or blending of the liquid and solid may introduce undesired entrained gas, such as air, within the blended product, which generally may be in the form of a liquid or slurry. In any event, a liquid pump 878 may be utilized between processor 874 and two-phase flow separator system 870 to pump liquid to two-phase flow separator system 870 along a product delivery line 889.

Two-phase flow separator system 870 generally includes a curvilinear flow line 871 having an inlet 873 in fluid communication with processor 874 to deliver fluid as an inlet fluid to flow separator system 870 and an outlet 875. Curvilinear flow line 871 forms a plurality generally horizontal, stacked curvilinear pipe loops arranged adjacent one another which are disposed about a vessel 877 forming a component of flow separator system 870. A riser 879 delivers gaseous fluid removed from the inlet fluid by curvilinear flow line 871 into vessel 877. Flow separator system 870 may include a vortex cluster system 881. Flow separator system 870 may further include an air relief mechanism 883 for maintaining a desired liquid level within vessel 877 and to dampen the downstream impact of inlet fluid flow fluctuations into flow separator system 870. As more specifically described above, in one or more embodiments, two-phase flow separator system 870 includes a curvilinear flow line system which may be combined with a fluid vessel to improve operation of the curvilinear flow line system, separating a two-phase fluid into a primarily liquid component and a primarily gaseous component. The separator system 870 separates fluid flow from processor 874 into a primarily liquid stream and a primarily gaseous stream. In one or more embodiments, the curvilinear flow line system is disposed around the outer perimeter of the fluid vessel, while in other embodiments, the curvilinear flow line system is disposed within the interior of the vessel. In one or more embodiments, a vortex cluster system may be utilized to treat the primarily gaseous stream, namely air, downstream of the curvilinear flow line system. The vortex cluster system may be positioned within the interior of a tank, while in other embodiments, the vortex duster system may be external to a tank. In yet other embodiments, a curvilinear flow line system may be combined with the vortex cluster system of the disclosure without any tank. In this regard, in some embodiments, the vortex cluster system disclosed herein may be, on its own, a two-phase flow separator system, such as annular vortex cluster system 200. For the avoidance of doubt, two-phase flow separator systems 870 may be any of the two-phase flow separator systems described in this disclosure.

Thus, in some embodiments, two-phase flow separator system 870 may include a first pipe having a first end and a second end with the pipe forming a plurality of curvilinear pipe loops arranged adjacent one another along a substantially vertical axis. The curvilinear pipe loops are generally horizontal and may be formed around a vessel, with the first end of the first pipe disposed adjacent an upper portion of the vessel and the second end of the first pipe disposed adjacent a lower portion of the vessel. At least a portion of the curvilinear pipe loops are of the same diameter and adjacent one another in a vertically stacked arrangement. At the second end of the first pipe is a fluid outlet. A gas outlet is formed in the first pipe between the first and second ends of the first pipe. In one embodiment, the gas outlet is adjacent the fluid outlet and leads to a riser in fluid communication with the interior of a fluid vessel. In one embodiment, the pipe loops are disposed around the exterior of the fluid vessel while in other embodiments, the pipe loops are contained within the fluid vessel. A backpressure mechanism may be provided in a fluid line downstream of the fluid outlet and upstream of a port in the fluid line which port is in fluid communication with the base of the fluid vessel.

In one or more embodiments, the riser is in fluid communication with an annular vortex cluster system that generally includes a top plate secured to and a vortex body forming an internal chamber in which a gradually narrowing, spiral channel is defined about a vortex hub positioned within the internal chamber. The spiral channel has a first end and a second end and gradually narrows in width W between the first and second ends. Formed in the hub generally adjacent the periphery of the hub are two or more cut bores that intersect the spiral channel, thus forming a leading edge and a trailing edge for each cut bore. Each cut bore extends through the base of the vortex body to form an outlet in fluid communication with a vortex tube extending down from the vortex body. Each vortex tube is in fluid communication with an aperture extending through the top plate. To the extent two-phase flow separator system 870 utilizes a fluid vessel, the annular vortex cluster system may be disposed in the upper portion of the fluid vessel.

A product leaving processor 874 is passed through system 870 in order to remove air before subsequent handing of the product. The liquid entering the first end of the first pipe may have a large proportion of air included with the liquid which air may have been entrained in the liquid through various processes, such as mixing or blending by processor 874. The liquid exiting the second end of the first pipe, after having passed through the plurality of curvilinear pipe loops, has been substantially scrubbed of the entrained air.

In other embodiments, a method of treating a multi-phase fluid stream recovered from a wellbore is provided. The method separates the multi-phase fluid stream into a first fluid component comprising primarily a gas phase and a second fluid component comprising primarily a liquid phase. Of course, the first component may include various gaseous hydrocarbons, such as natural gas, and the fluid component may include liquid hydrocarbons, drilling fluids, water and the like, as well as solids, such as cuttings. In any event, the multi-phase fluid stream recovered from a wellbore is directed downward through a plurality of descending curvilinear loops to stratify the multi-phase fluid stream into the first fluid component and the second fluid component. Thereafter, the first fluid component is separated from the stratified multi-phase fluid stream and directed into a vortex tube, where the first fluid component is then separated into a third fluid component comprising primarily a liquid phase and a fourth fluid component comprising primarily a gas phase. The second component and the third component may then be combined for further processing. The first component and the fourth component may likewise be combined for further processing. For example, the combined second and third components may be collected in a liquid storage tank such as those described herein. Likewise, the combined first and fourth components may be collected is a gas storage vessel.

Thus, various systems have been described has been described. A two-phase flow separator system may include a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior; a first pipe having a first end and a second end, the first pipe disposed about the vessel so as to form a plurality of descending curvilinear pipe loops arranged adjacent one another along the vertical axis, said pipe loops adjacent one another in a vertically stacked arrangement; and a riser having a first lower end in fluid communication with the first pipe adjacent the second end of the first pipe and the riser having a second upper end in fluid communication with the fluid vessel. In other embodiments, a two-phase flow separator system may include a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior; a first pipe having a first end and a second end, the first pipe disposed about the vessel so as to form a plurality of descending curvilinear pipe loops arranged adjacent one another along the vertical axis, said pipe loops adjacent one another in a vertically stacked arrangement; and a vortex cluster system disposed within the fluid vessel; and a riser having a first lower end in fluid communication with the first pipe adjacent the second end of the first pipe and the riser having a second upper end in fluid communication with the vortex cluster system. In other embodiments, a two-phase flow separator system may include a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior; a first pipe having a first end and a second end, the first pipe disposed about the vessel so as to form a plurality of descending curvilinear pipe loops arranged adjacent one another along the vertical axis, said pipe loops adjacent one another in a vertically stacked arrangement; a riser having a first lower end in fluid communication with the first pipe adjacent the second end of the first pipe and the riser having a second upper end in fluid communication with the fluid vessel. In other embodiments, a two-phase flow separator system is an annular vortex cluster system comprising a fluid injection conduit forming an annular channel having a first fluid inlet and a second end, with a plurality of vertically extending vortex tubes spaced apart from one another along at least a portion of the length of the channel, each tube extending down into said vessel and comprising a cylindrical, vertical sidewall with an opening in the sidewall, the opening adjacent the channel. In other embodiments, a two-phase flow separator system may include a substantially vertical axis around which is disposed a first pipe having a first end and a second end, the first pipe forming a plurality of descending curvilinear pipe loops arranged adjacent one another along the vertical axis, said pipe loops adjacent one another in a vertically stacked arrangement, the first pipe further having a liquid outlet at the second end with a substantially horizontal portion disposed between the pipe loops and the liquid outlet, the substantially horizontal portion having a gas outlet port disposed along an upper surface of the substantially horizontal portion; and a backpressure device positioned along the first pipe between the liquid outlet and the gas outlet port. In other embodiments a two-phase flow separator system may include a substantially vertical axis around which is disposed a first pipe having a first end and a second end, the first pipe forming a plurality of descending curvilinear pipe loops arranged adjacent one another along the vertical axis, said pipe loops adjacent one another in a vertically stacked arrangement, the first pipe further having a liquid outlet at the second end with a substantially horizontal portion disposed between the pipe loops and the liquid outlet, the substantially horizontal portion having a gas outlet port disposed along an upper surface of the substantially horizontal portion; a backpressure device positioned along the first pipe between the liquid outlet and the gas outlet port; and an air relief mechanism in fluid communication with the interior gas outlet port. An engine system may include a fuel vessel; an internal combustion engine in fluid communication with the fuel vessel via a fuel supply line, said engine having an exhaust port; a first two-phase flow separator system fluidically disposed along the fuel supply line and a second two-phase flow separator system in fluid communication with the engine exhaust port. In other embodiments, an engine system may include a fuel vessel; an internal combustion engine in fluid communication with the fuel vessel via a fuel supply line; and a two-phase flow separator system fluidically disposed along the fuel supply line between the engine and the fuel vessel. A fuel bunkering system may include a fuel supply line fluidically coupling a first fuel storage tank with a second fuel storage tank; a fuel pump disposed to pump fuel along the fuel supply line from the first storage tank to the second storage tank; and a two-phase flow separator system fluidically coupled along the fuel supply line between the first and second fuel storage tanks. A system for transferring a liquid may include a first liquid storage tank in fluid communication with a second liquid storage tank by a liquid supply line; a pump disposed to pump liquid from the first storage tank to the second storage tank; and a and a two-phase flow separator system fluidically coupled along the liquid supply line between the first and second fuel storage tanks. A system for manufacturing a product may include a liquid storage tank in fluid communication with a processor; a solid storage vessel; a solid delivery system; a pump in fluid communication with the processor; and a two-phase flow separator system in fluid communication with the pump. In other embodiments, the system for manufacturing a product may include a liquid storage tank in fluid communication with a processor; an additive source; an additive delivery system; a pump in fluid communication with the processor; and a two-phase flow separator system in fluid communication with the pump.

The following elements may be combined alone or in combination with any other elements for any of the foregoing embodiments:

The plurality of curvilinear pipe loops are in a vertically stacked arrangement so that each curvilinear pipe loop is substantially horizontal.

The plurality of curvilinear pipe loops each have an inner diameter that is larger than the vessel outer diameter and are in a vertically stacked arrangement about the fluid vessel so that each curvilinear pipe loop is substantially horizontal.

The plurality of curvilinear pipe loops extending along only a portion of the height H of the fluid vessel.

The plurality of vertically stacked pipe loops are spaced apart above the port in the lower portion of the fluid vessel.

The first pipe includes a substantially horizontal portion adjacent the second end of the first pipe with a liquid outlet at the second end of the first pipe and a gas outlet port disposed in an upper surface of the substantially horizontal portion, the first lower end of the substantially vertical riser in fluid communication with the gas outlet port.

The riser is substantially vertical.

A liquid flow line in fluid communication with the second end of the first pipe, the liquid flow line including a first outlet in fluid communication with the lower portion of the fluid vessel and a second outlet downstream of first outlet.

A liquid flow line in fluid communication with the second end of the first pipe, the liquid flow line including an outlet and a backpressure device positioned along the liquid flowline between the second end of the first pipe and the liquid flow line outlet.

The liquid flow line passes under the fluid vessel such that the first outlet is in fluid communication with the lower portion of the fluid vessel via a liquid port formed in a lowest end of the fluid vessel.

A backpressure device positioned along the liquid flow-line upstream of the first outlet.

A vortex cluster system disposed within the interior of the fluid vessel and in fluid communication with the second upper end of the riser.

The riser and the vortex cluster system are in fluid communication with one another via the port in the upper vessel portion.

The vortex cluster system comprises a fluid injection conduit forming a channel having a first end in fluid communication with the riser and a second end adjacent at least one vertically positioned vortex tube extending down into said vessel, each vortex tube having a cylindrical, vertical sidewall portion with an opening in the sidewall, the opening adjacent the channel.

The channel extends from a first end to a second end, wherein the channel is linear between the first end and the second end.

The channel extends from a first end to a second end, wherein the channel tapers between the first end and the second end.

The channel is characterized by opposing sides with at least one vortex tube positioned along each opposing side of the channel.

The channel extends from a first end to a second end, wherein the cross-sectional area of the channel tapers between the first end and the second end.

The channel extends from a first end to a second end and is characterized by opposing sides, wherein the cross-sectional area of the channel tapers between the first end and the second end and at least one vortex tube is positioned along each opposing side of the channel.

At least six vortex tubes, with three vortex tubes positioned along each opposing side of the channel and spaced apart from one another along the length of the side.

A first fluid storage tank in fluid communication with the first end of the first pipe and a second fluid storage tank in fluid communication with the second end of the first pipe.

A first fluid storage tank in fluid communication with the first end of the first pipe and a second fluid storage tank in fluid communication with the second end of the first pipe.

The two-phase flow separator system comprises a fluid vessel having a height H along a substantially vertical axis, an upper vessel portion and a lower vessel portion with a port in the upper portion and a port in the lower portion, the fluid vessel formed of a vessel wall so as to have an outer vessel diameter and an inner vessel diameter and define a vessel interior; a first pipe having a first end and a second end, the first pipe disposed about the vessel so as to form a plurality of descending curvilinear pipe loops arranged adjacent one another along the vertical axis, said pipe loops adjacent one another in a vertically stacked arrangement; a riser having a first lower end in fluid communication with the first pipe adjacent the second end of the first pipe and the riser having a second upper end in fluid communication with the fluid vessel.

The two-phase flow separator system comprises an annular vortex cluster system.

A fuel pump fluidically disposed along the fuel line between the fuel vessel and the two-phase flow separator.

A first sensor in fluid communication with the second end of the first pipe of the first two-phase flow separator system and a second sensor in fluid communication with the second end of the second two-phase flow separator system; and a control system disposed to compare liquid content measured by first sensor to liquid content measured by second sensor.

The fuel vessel is in fluid communication with the first end of first pipe of first two-phase flow separator and the second end of first pipe of first two-phase flow separator is in fluid communication with the engine; and the first end of first pipe of second two-phase flow separator is in fluid communication with the exhaust port of the engine and the second end of first pipe of second two-phase flow separator is in fluid communication with fuel vessel.

A sensor disposed along the fuel supply line between the second end of the first pipe of the two-phase flow separator system and the second fuel storage tank.

The first fuel tank is on a barge and the second fuel tank is on a ship.

The first fuel tank is on land and the second fuel tank is on a marine vessel.

The two-phase flow separator system and the first fuel tank are on a barge.

A sensor disposed along the liquid supply line between the two-phase flow separator and the second storage tank.

The flow separator system comprises a curvilinear flow loop having an inlet in fluid communication with the blender and an outlet in fluid communication with the pump.

Curvilinear flow loop is disposed about a fluid vessel.

A riser having a first lower end in fluid communication with the curvilinear flow loop and a second upper end in fluid communication with the fluid vessel.

A vortex cluster system disposed within the fluid vessel and in fluid communication with the upper end of the substantially vertical riser.

An air relieve vessel in fluid communication with the fluid vessel.

A fluid distribution manifold disposed between the flow separator system and the pump.

A plurality of blenders in fluid communication with the flow separator system.

A plurality of pumps in fluid communication with the flow separator system.

A fluid distribution manifold disposed in fluid communication with one or more blenders and a plurality of flow separator systems in fluid communication with the fluid distribution manifold.

The fluid distribution manifold includes a plurality of outlets, each manifold outlet in fluid communication with a pump, with a flow separator system fluidically coupled between each manifold outlet and the corresponding pump.

The curvilinear flow loop comprises a plurality of horizontally oriented, vertically stacked loops disposed around the fluid vessel.

A fluid vessel formed along a substantially vertical axis and having an upper portion and a lower portion with a port in the upper portion and a port in the lower portion, the fluid vessel formed of a vessel wall so as to have an outer vessel diameter and an inner vessel diameter and define a vessel interior.

The vortex cluster system disposed within the interior of the fluid vessel.

The first pipe has a first end and a second end with a plurality of curvilinear pipe loops formed between the first end and second end, the loops arranged adjacent one another about the substantially vertical axis.

The plurality of curvilinear pipe loops are in a vertically stacked arrangement so that each curvilinear pipe loop is substantially horizontal.

The plurality of curvilinear pipe loops are disposed around the fluid vessel.

The plurality of curvilinear pipe loops are disposed within the fluid vessel.

The plurality of curvilinear pipe loops each have an inner diameter that is larger than the vessel outer diameter and are in a vertically stacked arrangement about the fluid vessel so that each curvilinear pipe loop is substantially horizontal.

The plurality of curvilinear pipe loops each have an outer diameter that is smaller than the vessel inner diameter and are in a vertically stacked arrangement within the fluid vessel so that each curvilinear pipe loop is substantially horizontal.

The plurality of curvilinear pipe loops extending along only a portion of the height of the fluid vessel.

The plurality of vertically stacked pipe loops spaced apart from a fluid inlet disposed in adjacent a lower end of fluid vessel.

A gas outlet port disposed along the first pipe adjacent the second end of the first pipe.

The gas outlet port disposed in an upper surface of the first pipe adjacent the second end of the first pipe.

The first pipe includes a substantially horizontal portion adjacent the second end with a liquid outlet at the second end.

The first pipe includes a substantially horizontal portion adjacent the second end with a liquid outlet at the second end and a gas outlet port disposed in an upper surface of the substantially horizontal portion of the first pipe.

A riser having a first lower end in fluid communication with the gas outlet port and a second upper end in fluid communication with the fluid vessel.

The riser is substantially vertical.

The second upper end of the riser is in fluid communication with an upper portion of the fluid vessel.

The second upper end of the riser is in fluid communication with a vortex cluster system.

A liquid flow line in fluid communication with the second end of the first pipe, the liquid flow line including a first outlet in fluid communication with a lower portion of the fluid vessel and a second outlet downstream of first outlet.

A liquid flow line in fluid communication with the second end of the first pipe, the liquid flow line including an outlet and a backpressure device positioned along the liquid flowline between the second end of the first pipe and the liquid flow line outlet.

A backpressure device positioned along the liquid flowline upstream of the first outlet.

An air relief mechanism in fluid communication with the interior of the fluid vessel to adjust a liquid level within fluid vessel.

A vortex cluster system comprising a fluid injection conduit forming a channel having a first end in fluid communication with said riser and a second end adjacent at least one vertically positioned vortex tube extending down into said vessel.

A plurality of vortex tubes.

At least two vortex tubes.

Each vortex tube comprises a cylindrical, vertical sidewall portion with an opening in the sidewall, the opening adjacent the channel.

A vortex cluster system comprising a fluid injection conduit forming a channel having a first end in fluid communication with said riser and a second end adjacent two spaced apart, vertically positioned vortex tubes extending down into said vessel, each tube comprising a cylindrical, vertical sidewall with an opening in the sidewall, the opening adjacent the channel.

The opening comprising a leading edge and a trailing edge, wherein the leading edge is generally parallel with the channel at the point of intersection of the leading edge and the channel.

The vortex tube has an upper first end with a gas port formed therein and a second open lower end.

The channel extends from a first end to a second end, wherein the cross-sectional area of the channel narrows from the first end to the second end.

The channel extends from a first end to a second end, wherein the channel is linear between the first end and the second end.

The channel extends from a first end to a second end, wherein the channel is curvilinear between the first end and the second end.

The channel extends from a first end to a second end, wherein the channel spirals between the first end and the second end.

The channel extends from a first end to a second end, wherein the channel tapers between the first end and the second end.

The channel is annular.

A vortex cluster system comprising a fluid injection conduit forming a linear channel having a first end in fluid communication with said riser and a second end, with a plurality of vertically extending vortex tubes spaced apart from one another along at least a portion of the length of the channel, each tube extending down into said vessel and comprising a cylindrical, vertical sidewall with an opening in the sidewall, the opening adjacent the channel.

Channel is characterized by opposing sides with at least one vortex tube positioned along each opposing side of the channel.

At least six vortex tubes, with three vortex tubes positioned along each opposing side of the channel and spaced apart from one another along the length of the side.

A linear vortex cluster system.

An annular vortex cluster system.

A vortex cluster system comprising a fluid inlet in fluid communication with a fluid injection conduit forming an annular channel having a first end and a second end, with a plurality of vertically extending vortex tubes spaced apart from one another along at least a portion of the length of the channel between the first and second ends, each tube extending down into said vessel and comprising a cylindrical, vertical sidewall with an opening in the sidewall, the opening adjacent the channel.

Channel is characterized by opposing sides with at least one vortex tube positioned along each opposing side of the channel.

Channel is characterized by opposing sides with each of the opposing sides having a different radius, wherein the plurality of vortex tubes are positioned along only the side with the smaller radius.

A fluid vessel adjacent the vortex tubes.

The vortex tubes disposed about the fluid vessel.

A liquid outlet disposed in the fluid vessel.

The additive source is a chemical tank.

The additive source is a solid storage container.

Likewise, various methods have been described. A method for manufacturing a product may include introducing a fluid into a blender; introducing an additive into a blender; utilizing the blender to mix the fluid with the additive to produce a product fluid; directing the product fluid downward through a plurality of descending curvilinear loops to stratify the product fluid into a first fluid component comprising primarily a gas phase and a second fluid component comprising primarily a liquid phase; and separating the first fluid component from the stratified product fluid. A method of separating a two-phase fluid stream into a first fluid component comprising primarily a gas phase and a second fluid component comprising primarily a liquid phase, the method including the steps of directing the two-phase fluid stream downward through a plurality of descending curvilinear loops to stratify the two-phase fluid stream into the first fluid component and the second fluid component; separating the first fluid component from the stratified two-phase fluid stream; and directing the removed first fluid component into a vortex tube and separating the first fluid component into a third fluid component comprising primarily a liquid phase and a fourth fluid component comprising primarily a gas phase. A method of separating a two-phase fluid stream into a first fluid component comprising primarily a gas phase and a second fluid component comprising primarily a liquid phase, the method including the steps of directing the two-phase fluid stream along an annular flow path between a first flow path end and a second flow path end; removing a portion of the two-phase fluid stream downward through a plurality of descending curvilinear loops to stratify the two-phase fluid stream into the first fluid component and the second fluid component; separating the first fluid component from the stratified two-phase fluid stream; and directing the removed first fluid component into a vortex tube and separating the first fluid component into a third fluid component comprising primarily a liquid phase and a fourth fluid component comprising primarily a gas phase. A method of operating an engine including the steps of pumping fuel from a fuel vessel downward through a plurality of descending curvilinear loops to stratify a fuel stream into the first fluid component comprising primarily a gas phase and a second fluid component comprising primarily a liquid phase; separating the first fluid component from the stratified two-phase fuel stream; directing the removed first fluid component into a vortex tube and separating the first fluid component into a third fluid component comprising primarily a liquid phase and a fourth fluid component comprising primarily a gas phase; measuring the volume of the second fluid component and thereafter, combusting the second fluid component in an engine to produce exhaust; directing the exhaust downward through a plurality of descending curvilinear loops to stratify the exhaust fluid stream into a first fluid component comprising primarily a gas phase and a second fluid component comprising primarily a liquid phase; separating the first fluid component from the stratified two-phase exhaust fluid stream; and directing the removed first fluid component into a vortex tube and separating the first fluid component into a third fluid component comprising primarily a liquid phase and a fourth fluid component comprising primarily a gas phase; measuring the volume of the second fluid component of the exhaust fluid stream; and comparing the measured second fluid component of the fuel stream and the second fluid component of the exhaust stream. A method of operating an engine including the steps of pumping fuel from a fuel vessel downward through a plurality of descending curvilinear loops to stratify a fuel stream into a first fluid component comprising primarily a gas phase and a second fluid component comprising primarily a liquid phase; separating the first fluid component from the stratified two-phase fuel stream; directing the removed first fluid component into a vortex tube and separating the first fluid component into a third fluid component comprising primarily a liquid phase and a fourth fluid component comprising primarily a gas phase; and combusting the second fluid component in an engine. A method of utilizing a liquid in the manufacture of a product, the method including the steps of introducing a fluid into a mixer; introducing an additive into a mixer; utilizing the mixer to mix the fluid with the additive to produce a product fluid; directing the product fluid downward through a plurality of descending curvilinear loops to stratify the product fluid into a first fluid component comprising primarily a gas phase and a second fluid component comprising primarily a liquid phase; separating the first fluid component from the stratified product fluid; and directing the second fluid component into a pump. A method of transferring liquid including the steps of pumping a liquid from a first liquid storage tank downward through a plurality of descending curvilinear loops to stratify the liquid into a two-phase fluid stream having a first fluid component comprising primarily a gas phase and a second fluid component comprising primarily a liquid phase; separating the first fluid component from the stratified two-phase fluid stream; and directing the removed first fluid component into a vortex tube and separating the first fluid component into a third fluid component comprising primarily a liquid phase and a fourth fluid component comprising primarily a gas phase; combining the second fluid component and the third fluid component and directing the combined flow into a second liquid storage vessel. A method of separating a two-phase fluid stream into a first fluid component comprising primarily a gas phase and a second fluid component comprising primarily a liquid phase, the method including the steps of directing the two-phase fluid stream downward through a plurality of descending curvilinear loops to stratify the two-phase fluid stream into the first fluid component and the second fluid component; separating the first fluid component from the second fluid component; and applying back pressure to the second fluid component to form a wave of liquid downstream of first fluid component separation to promote flow of the first fluid component away from the stratified two-phase fluid stream. A method of treating a multi-phase fluid stream recovered from a wellbore into a first fluid component comprising primarily a gas phase and a second fluid component comprising primarily a liquid phase, the method including the steps of producing a fluid stream from a wellbore; directing the wellbore fluid stream downward through a plurality of descending curvilinear loops to stratify the multi-phase fluid stream into the first fluid component and the second fluid component; separating the first fluid component from the stratified multi-phase fluid stream; and directing the removed first fluid component into a vortex tube and separating the first fluid component into a third fluid component comprising primarily a liquid phase and a fourth fluid component comprising primarily a gas phase.

The following elements may be combined alone or in combination with any other elements for any of the foregoing method embodiments:

Directing the removed first fluid component into a vortex tube and separating the first fluid component into a third fluid component comprising primarily a liquid phase and a fourth fluid component comprising primarily a gas phase.

Utilizing the product fluid to manufacture milk.

Utilizing the product fluid to manufacture a chemical.

Utilizing the product fluid to manufacture asphalt.

Applying back pressure to the second fluid component to form a wave of liquid downstream of first fluid component separation to promote flow of the first fluid component away from the stratified two-phase fluid stream.

Directing a primarily gaseous portion of the fluid stream into a vortex cluster system.

Directing a primarily liquid portion of the fluid stream to the pump.

The two-phase fluid stream comprises milk.

The two-phase fluid stream comprises a chemical.

The two-phase fluid stream comprises bunkering fuel.

The two-phase fluid stream comprises asphalt.
The two-phase fluid stream comprises liquid fuel.
The additive is a chemical.
The additive is a solid.
The additive is a liquid.
Combining the second fluid component and the third fluid component.
Injecting the second fluid component and the third fluid component into an engine.
Combining the second fluid component and the third fluid component and measuring the volume of the combined fluid components.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed is:

1. A two-phase flow separator system comprising:
   a fluid vessel having a height H and extending along a substantially vertical axis from a first end of the fluid vessel to a second end of the fluid vessel below the first end, an upper vessel portion adjacent the first end of the fluid vessel and a lower vessel portion below the upper vessel portion and adjacent the second end of the fluid vessel with a port in the upper vessel portion and a port in the lower vessel portion, the fluid vessel formed of a vessel wall so as to have an outer vessel diameter and an inner vessel diameter and define a vessel interior;
   a first pipe having a first end and a second end, the first pipe disposed about the vertical axis so as to form a plurality of descending curvilinear pipe loops arranged adjacent one another along the vertical axis, said pipe loops adjacent one another in a vertically stacked arrangement;
   a riser having a first end in fluid communication with the first pipe adjacent the second end of the first pipe and the riser having a second end above the riser first end and adjacent the first end of the first pipe; and
   a vortex cluster system in fluid communication with the second end of the riser.

2. The system of claim 1, wherein the vertically stacked, plurality of descending curvilinear pipe loops arranged adjacent one another along the vertical axis each have an outer diameter that is smaller than the inner vessel diameter and are disposed within the vessel interior.

3. The system of claim 1, wherein the plurality of descending curvilinear pipe loops each have an inner diameter that is larger than the vessel outer diameter and are in a vertically stacked arrangement about the fluid vessel so that each curvilinear pipe loop is substantially horizontal.

4. The system of claim 1, wherein the plurality of descending curvilinear pipe loops extend along only a portion of the height H of the fluid vessel and are spaced apart above the port in the lower vessel portion.

5. The system of claim 1, wherein the first pipe includes a substantially horizontal portion adjacent the second end of the first pipe with a liquid outlet at the second end of the first pipe and a gas outlet port disposed along the substantially horizontal portion; and wherein the riser is substantially vertical and the first end of the substantially vertical riser is in fluid communication with the gas outlet port.

6. The system of claim 1, further comprising a liquid flow line in fluid communication with the second end of the first pipe, the liquid flow line including a first outlet in fluid communication with the port in the lower vessel portion and a second outlet downstream of the first outlet.

7. The system of claim 6, further comprising a backpressure device positioned along the liquid flow line between the second end of the first pipe and the liquid flow line second outlet.

8. The system of claim 1, wherein the vortex cluster system comprises a fluid injection conduit in fluid communication with the second end of the riser, the fluid injection conduit forming a channel having a first end and a second end, with a plurality of vertically extending vortex tubes spaced apart from one another along at least a portion of the length of the channel between the first and second ends, each vortex tube extending down into said fluid vessel and comprising a cylindrical, vertical sidewall with an opening in the sidewall, the opening adjacent the channel.

9. The system of claim 1, wherein the vortex cluster system is disposed within the interior of the fluid vessel.

10. The system of claim 8, wherein the channel extends from a first end to a second end, and wherein the channel is linear between the first end and the second end.

11. The system of claim 8, wherein the channel extends from a first end to a second end, and wherein the channel is curvilinear between the first end and the second end.

12. The system of claim 8, wherein the channel extends from a first end to a second end, and wherein the channel tapers between the first end and the second end.

13. A two-phase flow separator system comprising:
   a fluid vessel having a height H and extending along a substantially vertical axis from a first end of the fluid vessel to a second end of the fluid vessel below the first end, an upper vessel portion adjacent the first end of the fluid vessel and a lower vessel portion below the upper vessel portion and adjacent the second end of the fluid vessel with a port in the upper vessel portion and a port in the lower vessel portion, the fluid vessel formed of a vessel wall so as to have an outer vessel diameter and an inner vessel diameter and define a fluid vessel interior;
   a first pipe having a first end and a second end, the first pipe disposed about the vessel adjacent the outer vessel diameter so as to form a plurality of descending curvilinear pipe loops arranged adjacent one another along the vertical axis, said pipe loops adjacent one another in a vertically stacked arrangement;
   a vortex cluster system disposed within the fluid vessel; and
   a riser having a first end adjacent the lower vessel portion and in fluid communication with the first pipe adjacent the second end of the first pipe and the riser having a second end adjacent the upper vessel portion and in fluid communication with the vortex cluster system.

14. The system of claim 13, wherein the plurality of curvilinear pipe loops extend along only a portion of the height H of the fluid vessel and are spaced apart above the port in the lower vessel portion; wherein the first pipe includes a substantially horizontal portion adjacent the second end of the first pipe with a liquid outlet at the second end of the first pipe and a gas outlet port disposed in an upper surface of the substantially horizontal portion; and wherein the riser is substantially vertical and the first lower end of the substantially vertical riser in fluid communication with the gas outlet port.

15. The system of claim 13, further comprising a liquid flow line in fluid communication with the second end of the first pipe, the liquid flow line including a first outlet in fluid communication with the port in the lower vessel portion and a second outlet downstream of the first outlet; and a back-pressure device positioned along the liquid flow line between the second end of the first pipe and the liquid flow line second outlet.

16. The system of claim 13, wherein the vortex cluster system comprises a fluid injection conduit in fluid communication with the second end of the riser, the fluid injection conduit forming a linear channel extending between a first end and a second end, with a plurality of vertically extending vortex tubes spaced apart from one another along at least a portion of the length of the channel between the first and second channel ends, each vortex tube extending down into said fluid vessel and comprising a cylindrical, vertical sidewall with an opening in the sidewall, the opening adjacent the channel; and wherein the channel tapers between the first end and the second end of the channel.

17. The system of claim 13, wherein the vortex cluster system comprises a fluid injection conduit in fluid communication with the second end of the riser, the fluid injection conduit forming a tapered, spiral channel extending between a first end and a second end, with a plurality of vertically extending vortex tubes spaced apart from one another along at least a portion of the length of the channel between the first and second channel ends, each vortex tube extending down into said fluid vessel and comprising a cylindrical, vertical sidewall with an opening in the sidewall, the opening adjacent the channel.

\* \* \* \* \*

UNITED STATES PATENT AND TRADEMARK OFFICE
CERTIFICATE OF CORRECTION

| | | |
|---|---|---|
| PATENT NO. | : 11,498,019 B2 | Page 1 of 1 |
| APPLICATION NO. | : 16/721406 | |
| DATED | : November 15, 2022 | |
| INVENTOR(S) | : David James Elms and Gregory Allen Hudspeth | |

It is certified that error appears in the above-identified patent and that said Letters Patent is hereby corrected as shown below:

In the Specification

Column 22, Line 14, change "miser" to -- riser --

Column 25, Line 30, change "duster" to -- cluster --

Signed and Sealed this
Tenth Day of January, 2023

Katherine Kelly Vidal
*Director of the United States Patent and Trademark Office*